United States Patent
Mukae

(10) Patent No.: US 12,103,711 B2
(45) Date of Patent: Oct. 1, 2024

(54) SATELLITE CONSTELLATION FORMING SYSTEM, SATELLITE CONSTELLATION FORMING METHOD, COMPUTER READABLE MEDIUM, AND GROUND DEVICE

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 504 days.

(21) Appl. No.: 17/603,343

(22) PCT Filed: May 31, 2019

(86) PCT No.: PCT/JP2019/021741
§ 371 (c)(1),
(2) Date: Oct. 13, 2021

(87) PCT Pub. No.: WO2020/240826
PCT Pub. Date: Dec. 3, 2020

(65) Prior Publication Data
US 2022/0177164 A1 Jun. 9, 2022

(51) Int. Cl.
*B64G 1/24* (2006.01)
*B64G 1/10* (2006.01)

(52) U.S. Cl.
CPC ........... *B64G 1/242* (2013.01); *B64G 1/1085* (2013.01); *B64G 1/244* (2019.05)

(58) Field of Classification Search
CPC ....... B64G 1/242; B64G 1/244; B64G 1/1085
See application file for complete search history.

(56) References Cited

U.S. PATENT DOCUMENTS 5,813,634 A 9/1998 Pizzicaroli et al.
6,655,637 B1 12/2003 Robinson
(Continued)

FOREIGN PATENT DOCUMENTS

CN 107506893 A 12/2017
JP 2004-255978 A 9/2004
(Continued)

OTHER PUBLICATIONS

European Office Action issued Aug. 3, 2023, in corresponding European Application No. 19931323.0.
(Continued)

*Primary Examiner* — Ramsey Refai
(74) *Attorney, Agent, or Firm* — XSENSUS LLP

(57) ABSTRACT

In a satellite constellation forming system, each satellite in an orbit satellite group includes a propulsion device to change velocity of each satellite in the orbit satellite group. A satellite constellation forming unit causes propulsion devices of satellites in the orbit satellite group to operate in synchronization, for each orbital plane of the plurality of orbital planes. The satellite constellation forming unit causes each satellite in an orbit satellite group in a first orbital plane of the plurality of orbital planes to perform an acceleration and deceleration process of repeating operation of accelerating for a first time period and then decelerating for the first time period. The satellite constellation forming unit causes each satellite in an orbit satellite group in an orbital plane adjacent to the first orbital plane to start the acceleration and deceleration process after a delay of a second time period.

13 Claims, 24 Drawing Sheets

(56) References Cited

U.S. PATENT DOCUMENTS

| | | |
|---|---|---|
| 2014/0240497 A1 | 8/2014 | Shefer |
| 2015/0346336 A1 | 12/2015 | Di Giorgio et al. |
| 2016/0311557 A1 | 10/2016 | Fuller |
| 2017/0026109 A1 | 1/2017 | Wyler |
| 2018/0022474 A1 | 1/2018 | Meek |
| 2018/0370658 A1 | 12/2018 | Amimoto et al. |

FOREIGN PATENT DOCUMENTS

| | | |
|---|---|---|
| JP | 2017-114159 A | 6/2017 |
| WO | 2014/097263 A1 | 6/2014 |

OTHER PUBLICATIONS

Extended European search report issued on May 3, 2022, in corresponding European patent Application No. 19931323.0, 9 pages.

Handley, "Delay is Not an Option: Low Latency Routing in Space", Available Online At: https://people.eecs.berkeley.edu/~sylvia/cs268-2019/papers/starlink.pdf, Nov. 15-16, 2018, 7 pages.

International Search Report and Written Opinion mailed on Aug. 27, 2019, received for PCT Application PCT/JP2019/021741, Filed on May 31, 2019, 9 pages including English Translation.

International Search Report and Written Opinion mailed on Aug. 20, 2019, received for PCT Application PCT/JP2019/021739, Filed on May 31, 2019, 8 pages including English Translation.

International Search Report and Written Opinion mailed on Aug. 27, 2019, received for PCT Application PCT/JP2019/021740, Filed on May 31, 2019, 8 pages including English Translation.

Office Action issued on Jun. 6, 2024, in corresponding co-pending U.S. Appl. No. 17/603,345, 31 pages.

SATELLITE CONSTELLATION FORMING SYSTEM, SATELLITE CONSTELLATION FORMING METHOD, COMPUTER READABLE MEDIUM, AND GROUND DEVICE

The present application is based on PCT filing PCT/JP2019/021741, filed May 31, 2019, the entire contents of which are incorporated herein by reference. This application is also related to U.S. Ser. No.: 17/603,342, entitled: "SATELLITE CONSTELLATION FORMING SYSTEM, SATELLITE CONSTELLATION FORMING METHOD, SATELLITE CONSTELLATION, AND GROUND DEVICE"; and U.S. Ser. No.: 17/603,345, entitled: "SATELLITE CONSTELLATION FORMING SYSTEM, SATELLITE CONSTELLATION FORMING METHOD, SATELLITE CONSTELLATION, DEORBIT METHOD, DEBRIS COLLECTION METHOD, AND GROUND DEVICE" filed concurrently with the present application, which are also incorporated herein by reference.

TECHNICAL FIELD

The present invention relates to a satellite constellation forming system, a satellite constellation forming method, a satellite constellation forming program, and a ground device. In particular, the present invention relates to a satellite constellation forming system, a satellite constellation forming method, a satellite constellation forming program, and a ground device for avoiding a risk of a collision between satellites.

BACKGROUND ART

In recent years, a large-scale satellite constellation of several hundred to several thousand satellites has been proposed. In space traffic management (STM), there is an increasing need to create international rules for avoiding a risk of a collision due to coexistence of a plurality of satellite constellations.

Patent Literature 1 discloses a technology for forming a satellite constellation composed of a plurality of satellites in the same circular orbit.

CITATION LIST

Patent Literature

Patent Literature 1: JP 2017-114159 A

SUMMARY OF INVENTION

Technical Problem

In a satellite constellation, it is generally arranged that different orbital planes all have the same orbital altitude. In orbital planes having the same orbital altitude and mutually different normal directions, there is a risk of a collision at an intersection point. The risk of a collision is very high in a satellite constellation in which there are many intersection points.

When each orbital plane has a different orbital altitude, the angle between orbital planes changes relatively with passage of time. When each orbital plane has a different orbital altitude, the satellite ground speed varies with each orbital plane, so that communication partners between adjacent altitudes will be shifted over a long period of operation. As a result, a problem is that the communication partners need to be changed.

It is an object of the present invention to maintain a relative angle between orbital planes while avoiding a risk of a collision in a satellite constellation.

Solution to Problem

A satellite constellation forming system according to the present invention forms a satellite constellation having a plurality of orbital planes in each of which a plurality of satellites fly as an orbit satellite group, the plurality of orbital planes having mutually different normal directions, each of the plurality of satellites in the orbit satellite group including a propulsion device to change velocity of each of the plurality of satellites in the orbit satellite group, and the satellite constellation forming system includes a satellite constellation forming unit to cause propulsion devices of the plurality of satellites in the orbit satellite group to operate in synchronization, for each orbital plane of the plurality of orbital planes, wherein the satellite constellation forming unit causes each satellite in an orbit satellite group in a first orbital plane of the plurality of orbital planes to perform an acceleration and deceleration process of repeating operation of accelerating for a first time period and then decelerating for the first time period, and causes each satellite in an orbit satellite group in an orbital plane adjacent to the first orbital plane to start the acceleration and deceleration process after a delay of a second time period from a time point when the acceleration and deceleration process is started in the first orbital plane, repeatedly for each of the plurality of orbital planes.

Advantageous Effects of Invention

In a satellite constellation forming system according to the present invention, a satellite constellation forming unit causes propulsion devices of satellites in an orbit satellite group to operate in synchronization, for each orbital plane of a plurality of orbital planes. The satellite constellation forming unit causes each satellite in an orbit satellite group in a first orbital plane of the plurality of orbital planes to perform an acceleration and deceleration process of repeating operation of accelerating for a first time period and then decelerating for the first time period. The satellite constellation forming unit causes each satellite in an orbit satellite group in an orbital plane adjacent to the first orbital plane to start the acceleration and deceleration process after a delay of a second time period from a time point when the acceleration and deceleration process is started in the first orbital plane, repeatedly for each of the plurality of orbital planes. Therefore, with the satellite constellation forming system according to the present invention, a relative angle between orbital planes can be maintained while avoiding a risk of a collision, so that there is an effect that communication partners between adjacent altitudes can be prevented from being shifted due to operation over a long period of time.

DESCRIPTION OF EMBODIMENTS

Figure 1:
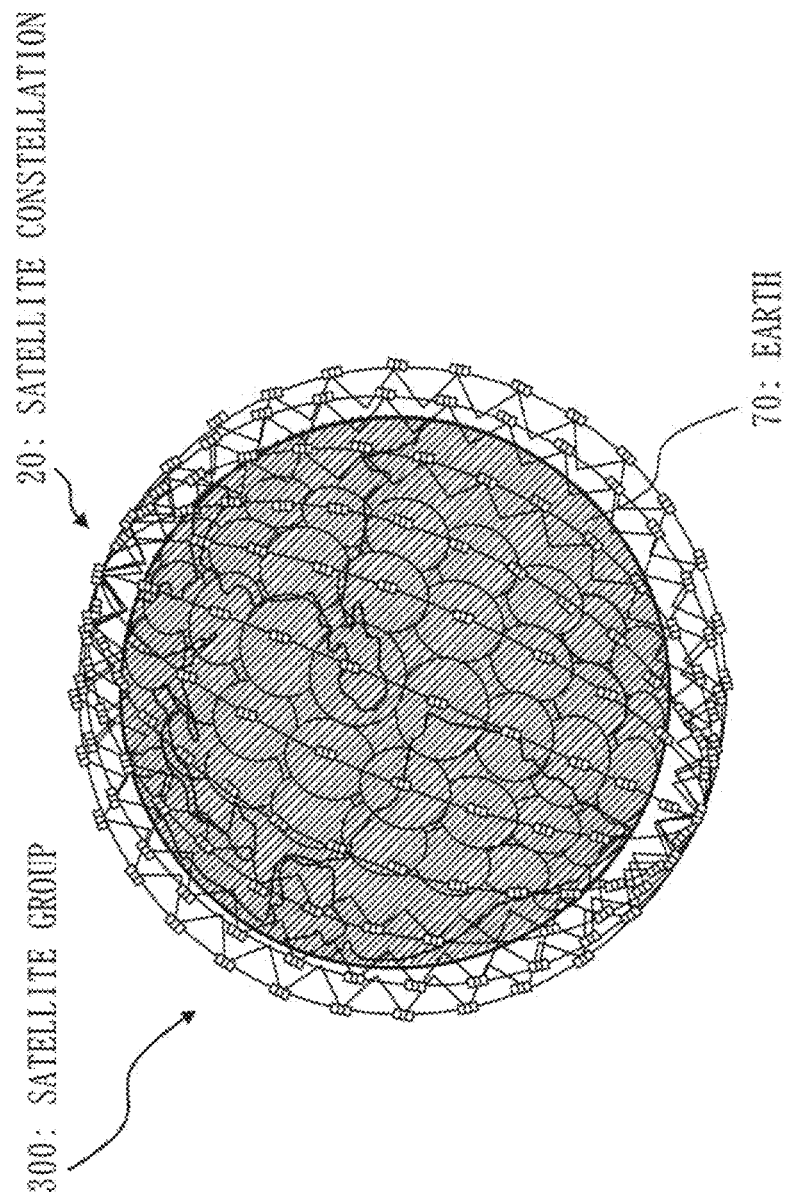
FIG. 1 is an example in which a plurality of satellites cooperatively realize a communication service to the ground over the entire globe of Earth.

Embodiments of the present invention will be described hereinafter with reference to the drawings. Throughout the drawings, the same or corresponding parts are denoted by the same reference signs. In the description of the embodiments, description of the same or corresponding parts will be suitably omitted or simplified. In the drawings hereinafter, the relative sizes of components may be different from actual ones. In the description of the embodiments, directions or positions such as "up", "down", "left", "right", "front", "rear", "top side", and "back side" may be indicated. These terms are used only for convenience of description, and are not intended to limit the placement and orientation of components such as devices, equipment, or parts.

Embodiment 1

FIG. 1 is a diagram illustrating an example in which a plurality of satellites cooperatively realize a communication service to the ground over the entire globe of Earth 70.

FIG. 1 illustrates a satellite constellation 20 that realizes a communication service over the entire globe.

The ground communication service range of each satellite of a plurality of satellites flying at the same altitude in the same orbital plane overlaps the communication service range of a following satellite. Therefore, with such satellites, the satellites in the same orbital plane can provide a communication service to a specific point on the ground in turn in a time-division manner.

However, a communication service can be provided with a single orbital plane only to an area directly below the orbit of satellites. Thus, another orbital plane rotated in the east-west direction with respect to Earth is placed adjacently, and a communication service is concurrently provided by a plurality of satellites in this orbital plane. By providing adjacent orbital planes in this way, communication services can be provided to the ground with widespread coverage across the adjacent orbits. Similarly, by placing a large number of orbital planes at approximately equal intervals around Earth, a communication service to the ground can be provided over the entire globe. When seen from a specific point on the ground, each satellite flies away in a short period of time. However, if satellites in orbit provide a communication service in turn in a time-division manner, a communication service can be provided continuously to any point on the ground. In this case, in order to share the communication service with a following satellite, each satellite provides and accepts necessary signals and information, using an inter-satellite communication method.

When a communication service is realized by a satellite constellation orbiting in low Earth orbit, the service areas of all satellites cover the entire globe, and a communication service for any given ground user is shared and continued by satellites flying above the user in turn while passing on signals and information. As a result, the communication service can be provided continuously to the ground user. By providing each satellite with the communication function between the satellite and the ground and also the inter-satellite communication function, signals and information can be transferred between satellites orbiting in proximity to each other. The transfer of signals and information that contributes to cooperation in a communication service mission will hereinafter be referred to as handover.

In a satellite constellation, it is generally arranged that different orbital planes all have the same orbital altitude. Since the ground speeds of satellites flying at the same orbital altitude are similar, the ground service ranges move according to the ground speeds of the satellites with the relative positional relationship of the service ranges of the individual satellites being maintained. If the service ranges of successive satellites in the same orbital plane or the service ranges of satellites in adjacent orbital planes exhaustively cover the ground surface, the service range will always be maintained when seen from any given point on the ground.

Figure 2:
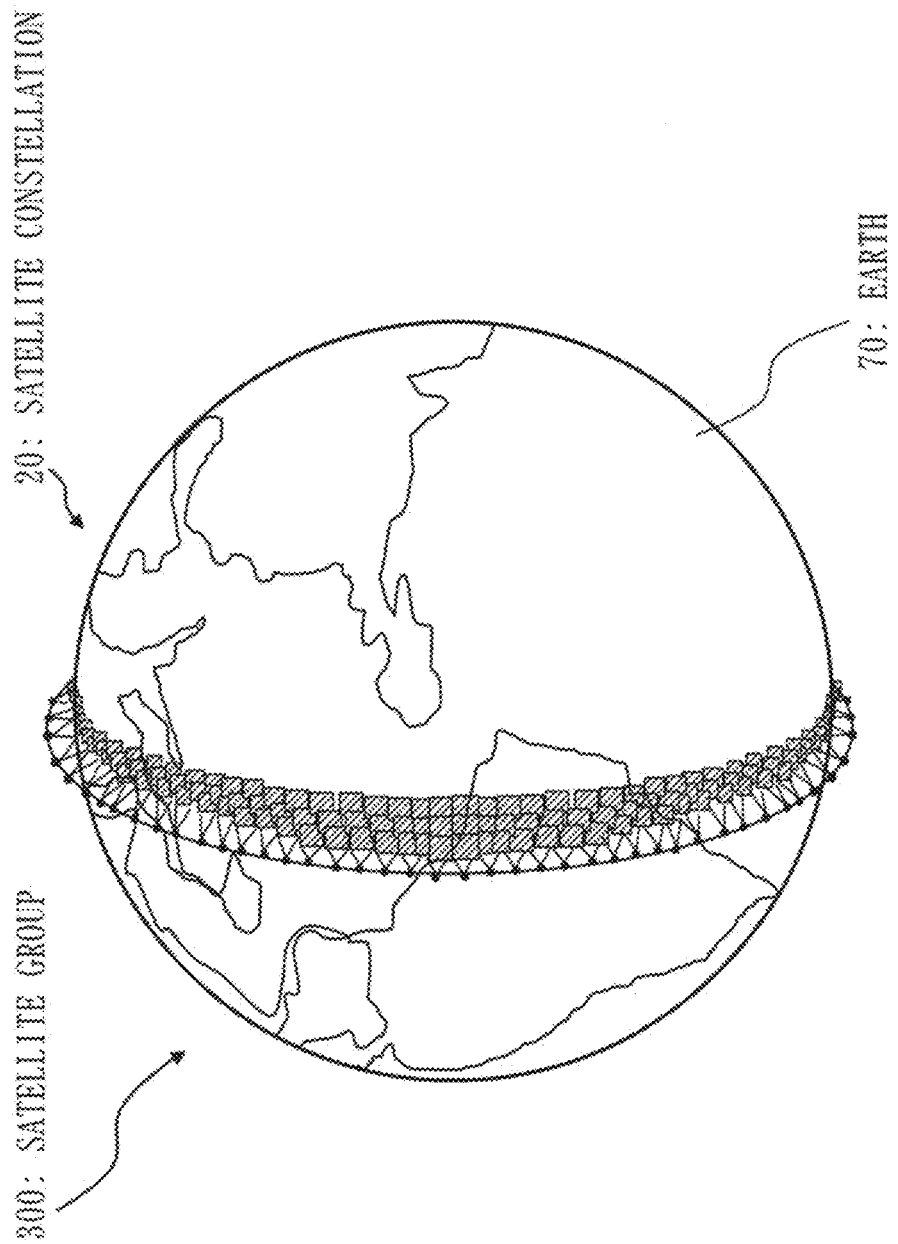
FIG. 2 is an example in which a plurality of satellites in a single orbital plane realize an Earth observation service.

FIG. 2 is a diagram illustrating an example in which an Earth observation service is realized by a plurality of satellites in a single orbital plane.

FIG. 2 illustrates a satellite constellation 20 that realizes an Earth observation service. In the satellite constellation of FIG. 2, satellites each equipped with an Earth observation device, which is an optical sensor or a radio sensor such as synthetic-aperture radar, fly at the same altitude in the same orbital plane. In this way, in a satellite group in which the ground imaging ranges of successive satellites overlap in a time-delay manner, a plurality of satellites in orbit provide an Earth observation service by capturing ground images in turn in a time-division manner. However, with the single orbital plane, a service can be provided only to the vicinity of an area directly below the orbit of the satellites. In contrast to this, if another orbital plane rotated in the east-west direction with respect to Earth is placed adjacently and a service by a plurality of satellites is similarly conducted concurrently, a ground service with widespread coverage between the adjacent orbits is possible. Similarly, by placing a large number of orbital planes at approximately equal intervals around Earth, an Earth observation service can be provided exhaustively over the entire globe. When seen from a specific point on the ground, each satellite flies away in a short period of time. However, if a plurality of satellites in orbit provide a service in turn in a time-division manner, an Earth observation service can always be provided to any given point on the ground.

*Description of Configuration*

A satellite constellation forming system 100 according to this embodiment forms a satellite constellation 20 having a plurality of orbital planes 21. In each orbital plane 21 of the plurality of orbital planes 21, a plurality of satellites 30 fly at the same orbital altitude.

The satellite constellation 20 formed by the satellite constellation forming system 100 according to this embodiment will be briefly described.

The satellite constellation 20 according to this embodiment is composed of a satellite group 300 made up of a plurality of satellites 30 in each orbital plane 21. In the satellite constellation 20 according to this embodiment, the satellite group 300 provides a service cooperatively. Specifically, the satellite constellation 20 refers to a satellite constellation composed of one satellite group provided by a communications service company as illustrated in FIG. 1. Specifically, the satellite constellation 20 refers to a satellite constellation composed of one satellite group provided by an observation service company as illustrated in FIG. 2.

Figure 3:
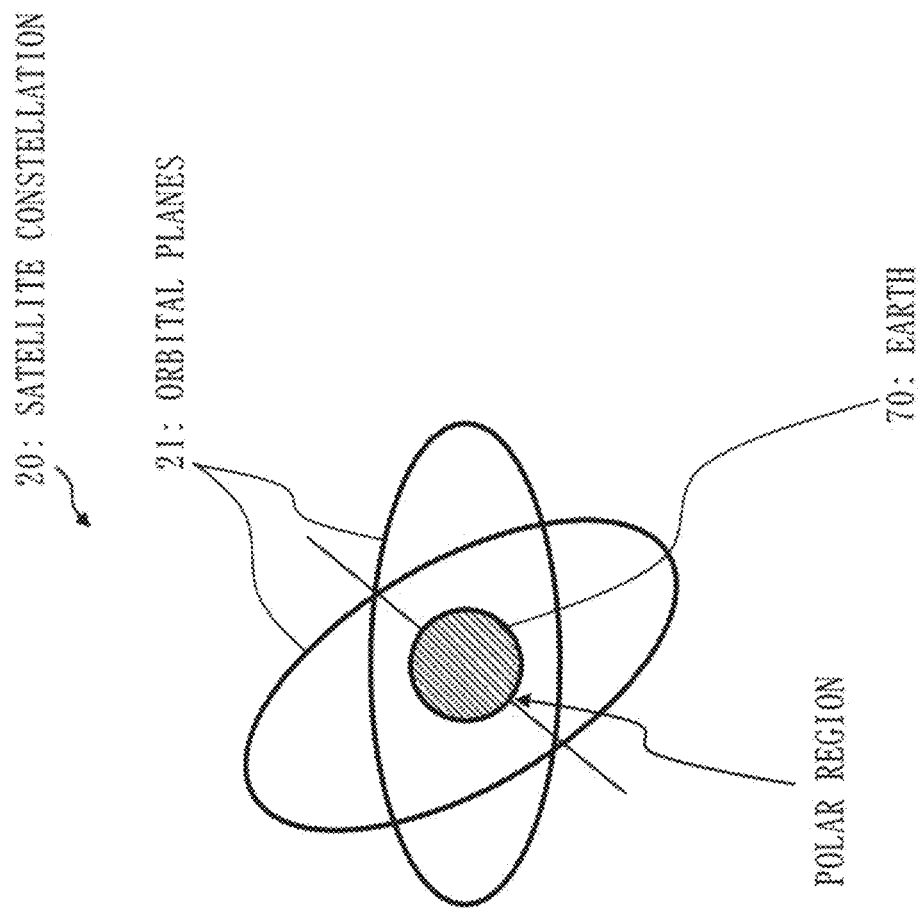
FIG. 3 is a schematic diagram illustrating an example of a satellite constellation according to Embodiment 1.
Figure 4:
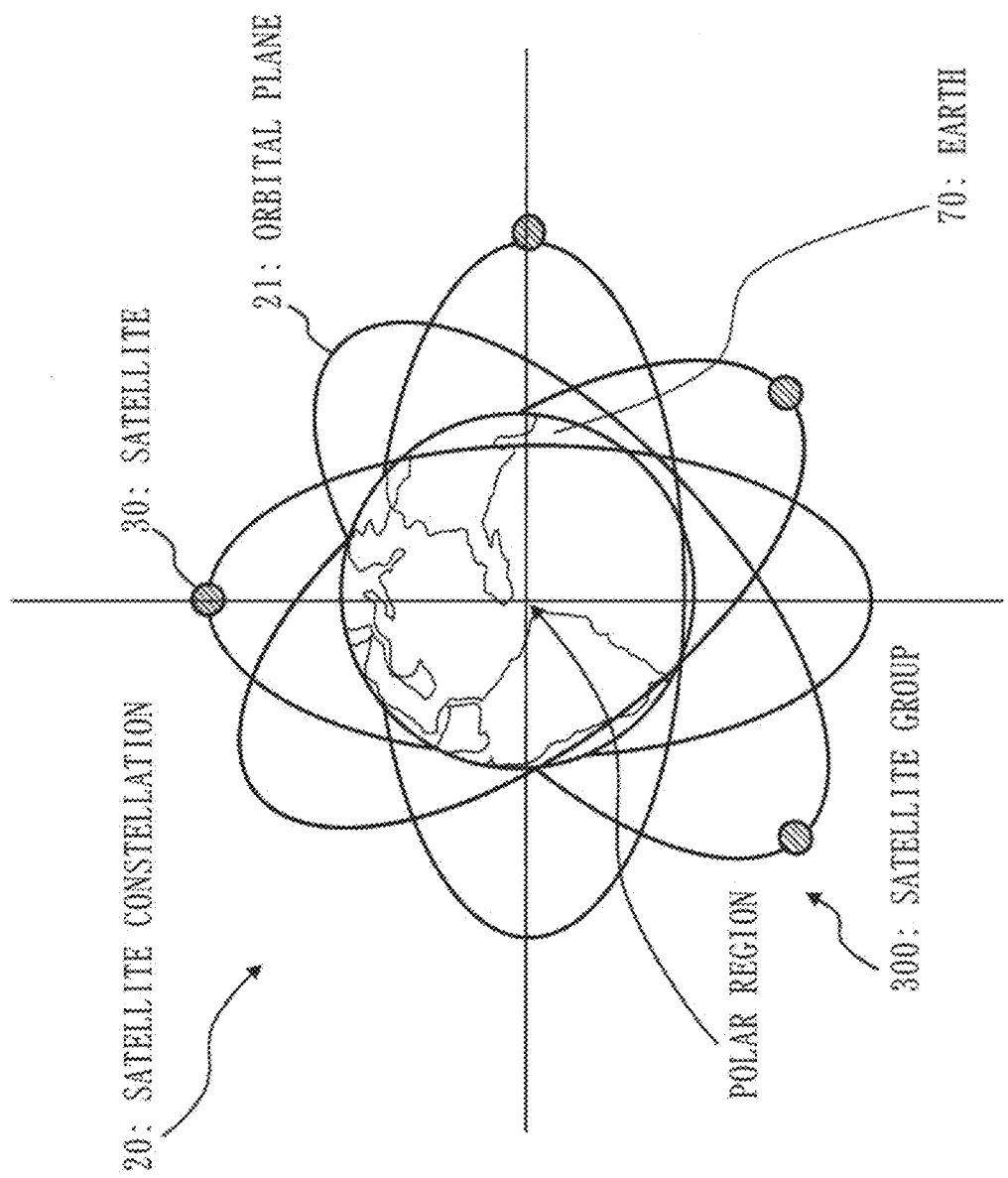
FIG. 4 is a schematic diagram illustrating an example of a satellite constellation according to Embodiment 1.

FIGS. 3 and 4 are schematic diagrams illustrating examples of the satellite constellation 20 according to this embodiment.

In FIG. 3, the orbital planes 21 in the satellite constellation 20 exist on mutually different planes. FIG. 3 illustrates an example in which the orbital inclination of each of the orbital planes 21 is approximately 90 degrees, but the orbital planes do not coincide with each other. That is, the orbital planes 21 intersect with each other. In FIG. 3, the orbital planes intersect with each other mainly in the vicinity of the polar regions. As an example, 20 or more satellites may fly as a plurality of satellites in each of the orbital planes 21. As an example, the satellite constellation 20 of FIG. 3 may have 20 or more orbital planes 21.

The satellite constellation 20 illustrated in FIG. 4 indicates an example in which the orbital inclination of each of the orbital plane 21 is not about 90 degrees, and the orbital planes 21 exist on mutually different planes. In FIG. 4, the orbital planes intersect with each other mainly in regions other than the polar regions.

In the satellite constellation 20 according to this embodiment, the orbital planes 21 have mutually different orbital altitudes. Furthermore, in the satellite constellation 20 according to this embodiment, each of the orbital planes 21 may have an orbital inclination such that the orbital periods of the orbital planes 21 are equal to each other.

In the satellite constellation 20 according to this embodiment, relative altitude differences between adjacent orbital planes in a plurality of orbital planes are sequentially arranged to be sinusoidal. Furthermore, in the satellite constellation 20 according to this embodiment, the orbital altitude of each orbital plane 21 of the plurality of orbital planes is sequentially changed while maintaining a sinusoidal arrangement of the relative altitude differences between adjacent orbital planes in the plurality of orbital planes.

The configuration of the satellite constellation 20 according to this embodiment will be described in detail later.

Figure 5:
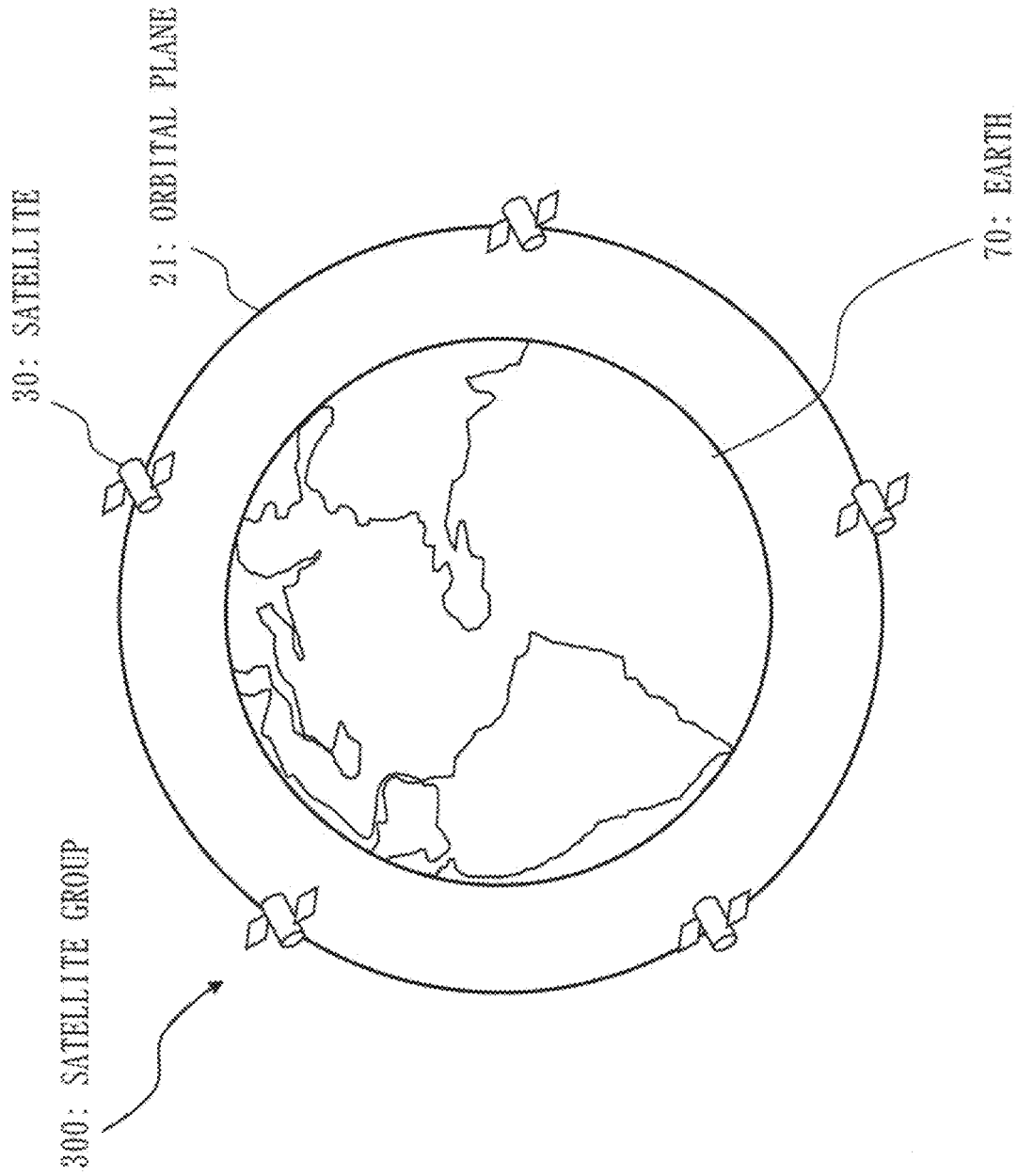
FIG. 5 is an example of a plurality of satellites flying in one orbital plane of a satellite constellation according to Embodiment 1.

FIG. 5 is an example of the satellites 30 flying in one of the orbital planes 21 of the satellite constellation 20 according to this embodiment.

The satellites 30 flying at the same altitude in the same orbital plane fly at relatively the same speeds while maintaining the relative phases in the orbital plane. Therefore, the satellites 30 flying at the same altitude in the same orbital plane will not collide with each other.

Figure 6:
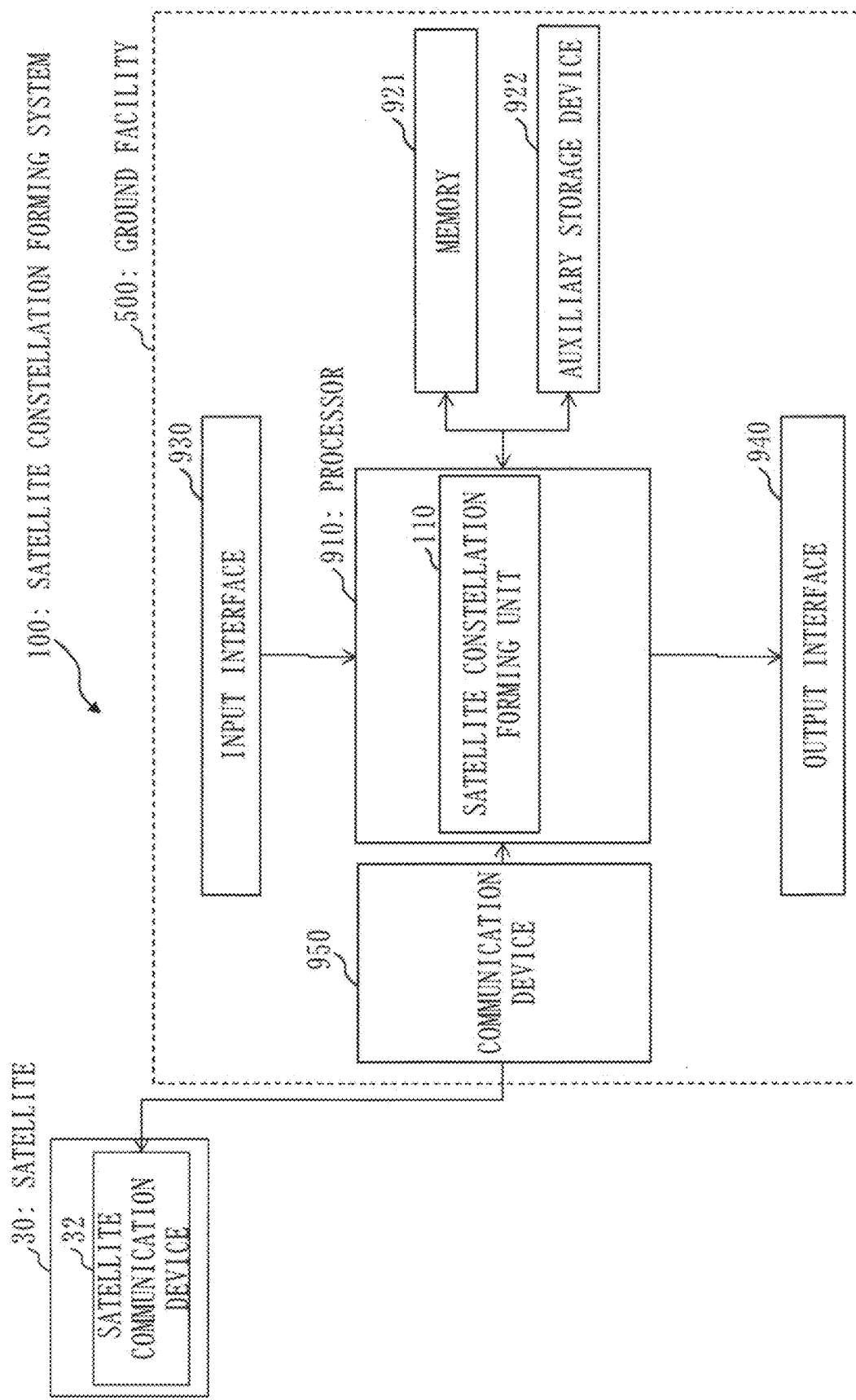
FIG. 6 is a configuration diagram of a satellite constellation forming system according to Embodiment 1.

FIG. 6 is a configuration diagram of the satellite constellation forming system 100 according to this embodiment.

The satellite constellation forming system 100 includes a computer. FIG. 6 illustrates the configuration with one computer. In actuality, a computer is included in each of the satellites 30 constituting the satellite constellation 20 and a ground facility 500 that communicates with the satellites 30. The computers provided in each of the satellites 30 and the ground facility 500 that communicates with the satellites 30 cooperatively realize the functions of the satellite constellation forming system 100 according to this embodiment. An example of a configuration of the computer that realizes the functions of the satellite constellation forming system 100 will be described below.

The satellite constellation forming system 100 includes a satellite 30 and a ground facility 500. The satellite 30 includes a satellite communication device 32 that communicates with a communication device 950 of the ground facility 500. FIG. 6 illustrates the satellite communication device 32 out of components included in the satellite 30.

The satellite constellation forming system 100 includes a processor 910, and also includes other hardware components such as a memory 921, an auxiliary storage device 922, an input interface 930, an output interface 940, and a communication device 950. The processor 910 is connected with other hardware components via signal lines and controls these other hardware components.

The satellite constellation forming system 100 includes a satellite constellation forming unit 110 as a functional element. The functions of the satellite constellation forming unit 110 are realized by hardware or software.

The satellite constellation forming unit 110 forms a satellite constellation 20 in which the orbital altitudes of a plurality of orbital planes 21 are mutually different. Furthermore, in this satellite constellation 20, relative altitude differences between adjacent orbital planes in the plurality of orbital planes are sequentially arranged to be sinusoidal. The satellite constellation forming unit 110 sequentially changes the orbital altitude of each orbital plane 21 of the plurality of orbital planes while maintaining a sinusoidal arrangement of the relative altitude differences between adjacent orbital planes in the plurality of orbital planes. Furthermore, in the satellite constellation 20, each orbital plane 21 may have an orbital inclination such that the orbital periods of the plurality of orbital planes 21 are equal to each other.

Specifically, the satellite constellation forming unit 110 sets orbital altitudes, the number of which is a number larger by one than the number of orbital planes of the plurality of orbital planes. Then, the satellite constellation forming unit 110 changes the orbital altitude of each orbital plane 21 of the plurality of orbital planes so that an unoccupied orbital altitude, at which no satellite is flying, is sequentially filled. With this function, the satellite constellation forming unit 110 sequentially changes the orbital altitude of each orbital plane 21 of the plurality of orbital planes.

The processor 910 is a device that executes a satellite constellation forming program. The satellite constellation forming program is a program for realizing the functions of the satellite constellation forming unit 110.

The processor 910 is an integrated circuit (IC) that performs operational processing. Specific examples of the processor 910 are a CPU, a digital signal processor (DSP), and a graphics processing unit (GPU).

The memory 921 is a storage device to temporarily store data. Specific examples of the memory 921 are a static random access memory (SRAM) and a dynamic random access memory (DRAM).

The auxiliary storage device 922 is a storage device to store data. A specific example of the auxiliary storage device 922 is an HDD. Alternatively, the auxiliary storage device 922 may be a portable storage medium, such as an SD (registered trademark) memory card, CF, a NAND flash, a flexible disk, an optical disc, a compact disc, a Blu-ray (registered trademark) disc, or a DVD. HDD is an abbreviation for Hard Disk Drive. SD (registered trademark) is an abbreviation for Secure Digital. CF is an abbreviation for CompactFlash (registered trademark). DVD is an abbreviation for Digital Versatile Disk.

The input interface 930 is a port to be connected with an input device, such as a mouse, a keyboard, or a touch panel. Specifically, the input interface 930 is a Universal Serial Bus (USB) terminal. The input interface 930 may be a port to be connected with a local area network (LAN).

The output interface 940 is a port to which a cable of an output device, such as a display, is to be connected. Specifically, the output interface 940 is a USB terminal or a High Definition Multimedia Interface (HDMI, registered trademark) terminal. Specifically, the display is a liquid crystal display (LCD).

The communication device 950 has a receiver and a transmitter. Specifically, the communication device 950 is a communication chip or a network interface card (NIC). In the satellite constellation forming system 100, communication between the ground facility 500 and the satellite 30 is performed via the communication device 950.

The satellite constellation forming program is read into the processor 910 and executed by the processor 910. The memory 921 stores not only the satellite constellation forming program but also an operating system (OS). The processor 910 executes the satellite constellation forming program while executing the OS. The satellite constellation forming program and the OS may be stored in the auxiliary storage device. The satellite constellation forming program and the OS that are stored in the auxiliary storage device are loaded into the memory 921 and executed by the processor 910. Part or the entirety of the satellite constellation forming program may be embedded in the OS.

The satellite constellation forming system 100 may include a plurality of processors as an alternative to the processor 910. These processors share the execution of the satellite constellation forming program. Each of the processors is, like the processor 910, a device that executes the satellite constellation forming program.

Data, information, signal values, and variable values that are used, processed, or output by the satellite constellation forming program are stored in the memory 921 or the auxiliary storage device 922, or stored in a register or a cache memory in the processor 910.

"Unit" of the satellite constellation forming unit 110 may be interpreted as "process", "procedure", or "step". "Process" of the satellite constellation formation process may be interpreted as "program", "program product", or "computer readable storage medium recording a program".

The satellite constellation forming program causes a computer to execute each process, each procedure, or each step, where "unit" of the above satellite constellation forming unit is interpreted as "process", "procedure", or "step". A satellite constellation forming method is a method performed by execution of the satellite constellation forming program by the satellite constellation forming system 100.

The satellite constellation forming program may be stored and provided in a computer readable recording medium or storage medium. Alternatively, the satellite constellation forming program may be provided as a program product.

Figure 7:
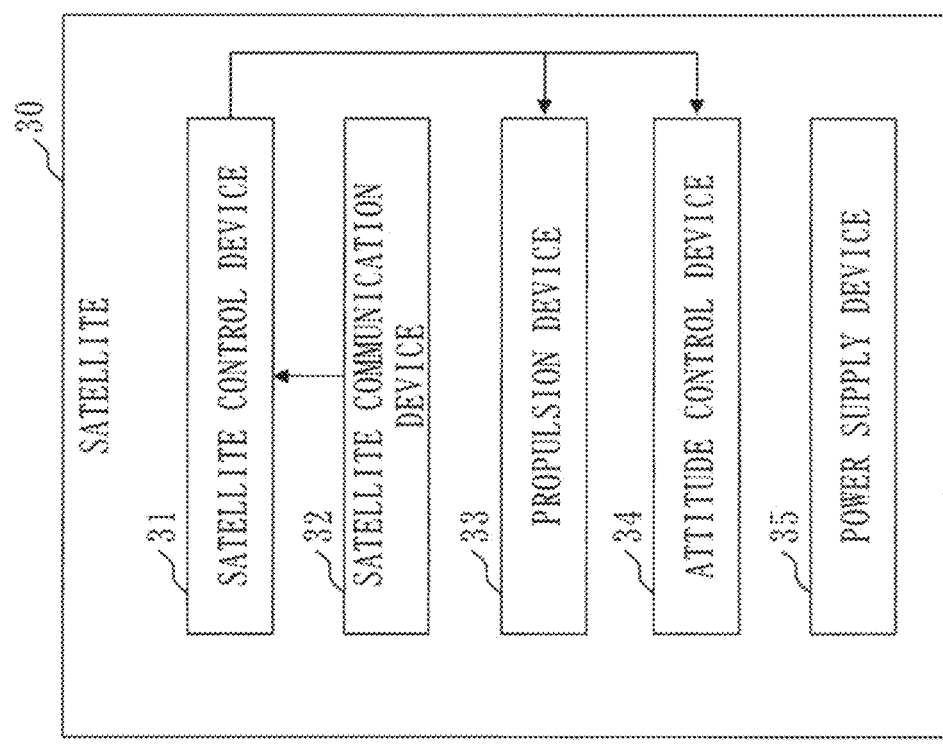
FIG. 7 is a configuration diagram of a satellite according to Embodiment 1.

FIG. 7 is a configuration diagram of the satellite 30 according to this embodiment.

The satellite 30 includes a satellite control device 31, the satellite communication device 32, a propulsion device 33, an attitude control device 34, and a power supply device 35. In addition, constituent elements that realize various functions are included. In FIG. 7, the satellite control device 31, the satellite communication device 32, the propulsion device 33, the attitude control device 34, and the power supply device 35 will be described.

The satellite control device 31 is a computer that controls the propulsion device 33 and the attitude control device 34, and includes a processing circuit. Specifically, the satellite control device 31 controls the propulsion device 33 and the attitude control device 34 in accordance with various commands transmitted from the ground facility 500.

The satellite communication device 32 is a device that communicates with the ground facility 500. Specifically, the satellite communication device 32 transmits various types of data regarding the satellite itself to the ground facility 500. The satellite communication device 32 receives various commands transmitted from the ground facility 500.

The propulsion device 33 is a device that provides thrust to the satellite 30 and changes the velocity of the satellite 30. Specifically, the propulsion device 33 is an electric propulsion device. Specifically, the propulsion device 33 is an ion engine or a Hall thruster.

The attitude control device 34 is a device to control attitude elements such as the attitude of the satellite 30 and the angular velocity and line of sight of the satellite 30. The attitude control device 34 changes the orientation of each attitude element to a desired orientation. Alternatively, the attitude control device 34 maintains each attitude element in a desired orientation. The attitude control device 34 includes an attitude sensor, an actuator, and a controller. The attitude sensor is a device such as a gyroscope, an Earth sensor, a sun sensor, a star tracker, a thruster, or a magnetic sensor. The actuator is a device such as an attitude control thruster, a momentum wheel, a reaction wheel, or a control moment gyroscope. The controller controls the actuator according to measurement data of the attitude sensor or various commands from the ground facility 500.

The power supply device 35 includes equipment such as a solar cell, a battery, and an electric control device, and provides electric power to each piece of equipment installed in the satellite 30.

The processing circuit included in the satellite control device 31 will be described.

The processing circuit may be dedicated hardware, or may be a processor that executes programs stored in a memory.

In the processing circuit, some functions may be realized by hardware, and the remaining functions may be realized by software or firmware. That is, the processing circuit can be realized by hardware, software, firmware, or a combination of these.

Specifically, the dedicated hardware is a single circuit, a composite circuit, a programmed processor, a parallel-programmed processor, an ASIC, an FPGA, or a combination of these.

ASIC is an abbreviation for Application Specific Integrated Circuit.

FPGA is an abbreviation for Field Programmable Gate Array.

Figure 8:
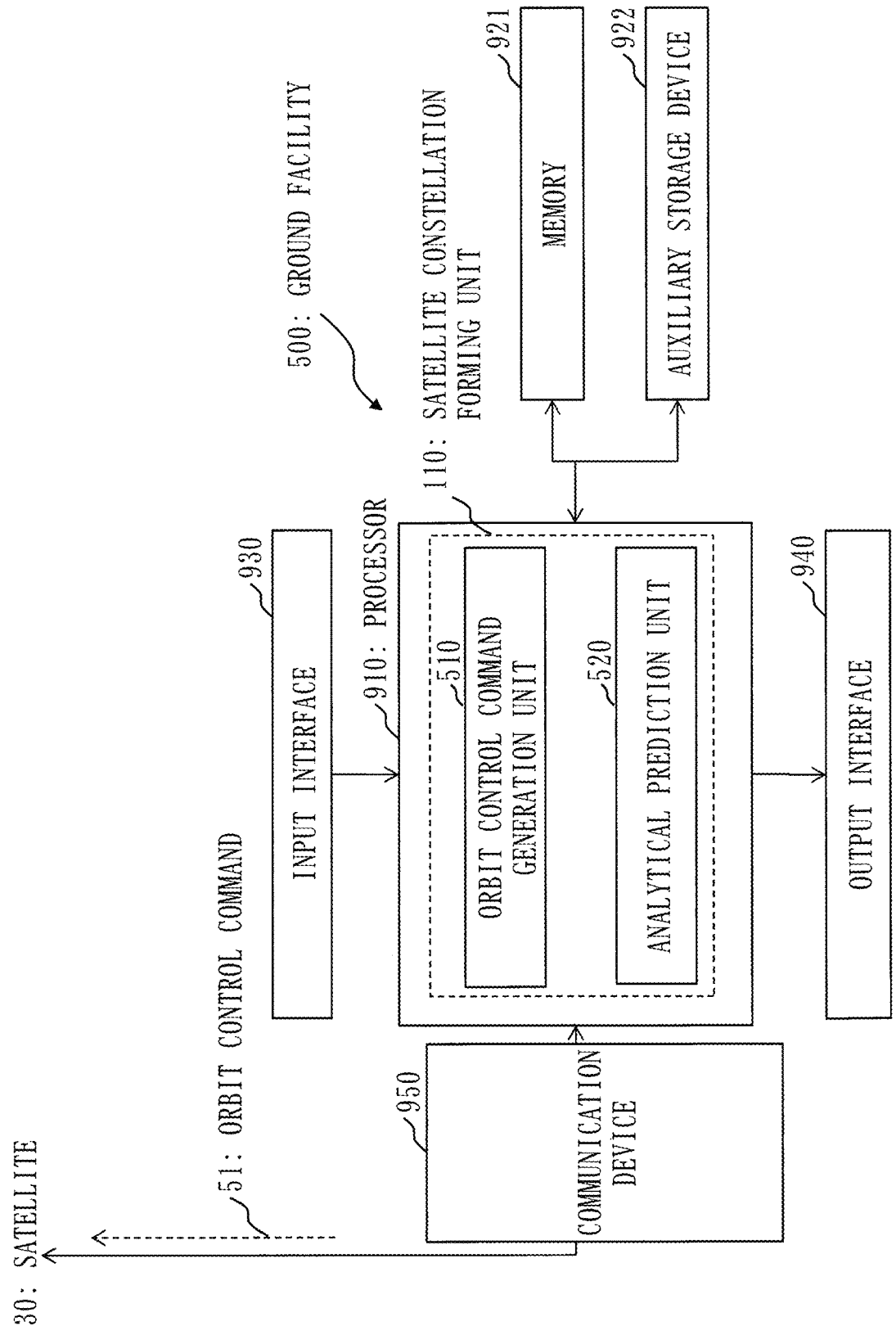
FIG. 8 is a configuration diagram of a ground facility according to Embodiment 1.

FIG. 8 is a configuration diagram of the ground facility 500 according to this embodiment.

The ground facility 500 controls a large number of satellites in all orbital planes by programs. The ground facility 500 is an example of a ground device. The ground device is composed of a ground station, such as a ground antenna device, a communication device connected with a ground antenna device, or an electronic computer, and a ground facility as a server or terminal connected with the ground station via a network. The ground device may include a communication device installed on a mobile object such as an airplane, a self-driving vehicle, or a mobile terminal.

The ground facility 500 forms a satellite constellation 20 by communicating with each satellite 30. The ground facility 500 is provided in the satellite constellation forming system 100. The ground facility 500 includes a processor 910, and also includes other hardware components such as a memory 921, an auxiliary storage device 922, an input interface 930, an output interface 940, and a communication device 950. The processor 910 is connected with other hardware components via signal lines, and controls these other hardware components. The hardware components of the ground facility 500 are substantially the same as those described for the satellite constellation forming system 100 in FIG. 6. In FIGS. 6 and 7, the hardware components included in the ground facility 500 have been described. However, hardware components having substantially the same functions may be included in a system, a satellite, a device, or a facility other than the satellite 30 and the ground facility.

The ground facility 500 includes an orbit control command generation unit 510 and an analytical prediction unit 520 as functional elements. The functions of the orbit control command generation unit 510 and the analytical prediction unit 520 are realized by hardware or software.

The communication device 950 transmits and receives signals for tracking and controlling each satellite 30 in the satellite group 300 constituting the satellite constellation 20. The communication device 950 transmits an orbit control command 51 to each satellite 30.

The analytical prediction unit 520 analytically predicts the orbit of the satellite 30.

The orbit control command generation unit 510 generates an orbit control command 51 to be transmitted to the satellite 30. Specifically, the orbit control command generation unit 510 generates the orbit control command 51 for forming a satellite constellation 20 in which the orbital altitudes of a plurality of orbital planes 21 are mutually different and relative altitude differences between adjacent orbital planes in the plurality of orbital planes are sequentially arranged to be sinusoidal. The orbit control command 51 further causes the orbital altitude of each of the orbital planes 21 to be sequentially changed while maintaining a sinusoidal arrangement of the relative altitude differences between adjacent orbital planes in the plurality of orbital planes. The orbit control command generation unit 510 may generate the orbit control command 51 for forming the satellite constellation 20 in which each orbital plane further has an orbital inclination such that the orbital periods of the plurality of orbital planes 21 are equal to each other.

As described above, the orbit control command generation unit 510 and the analytical prediction unit 520 realize the functions of the satellite constellation forming unit 110. That is, the orbit control command generation unit 510 and the analytical prediction unit 520 are examples of the satellite constellation forming unit 110.

Figure 9:
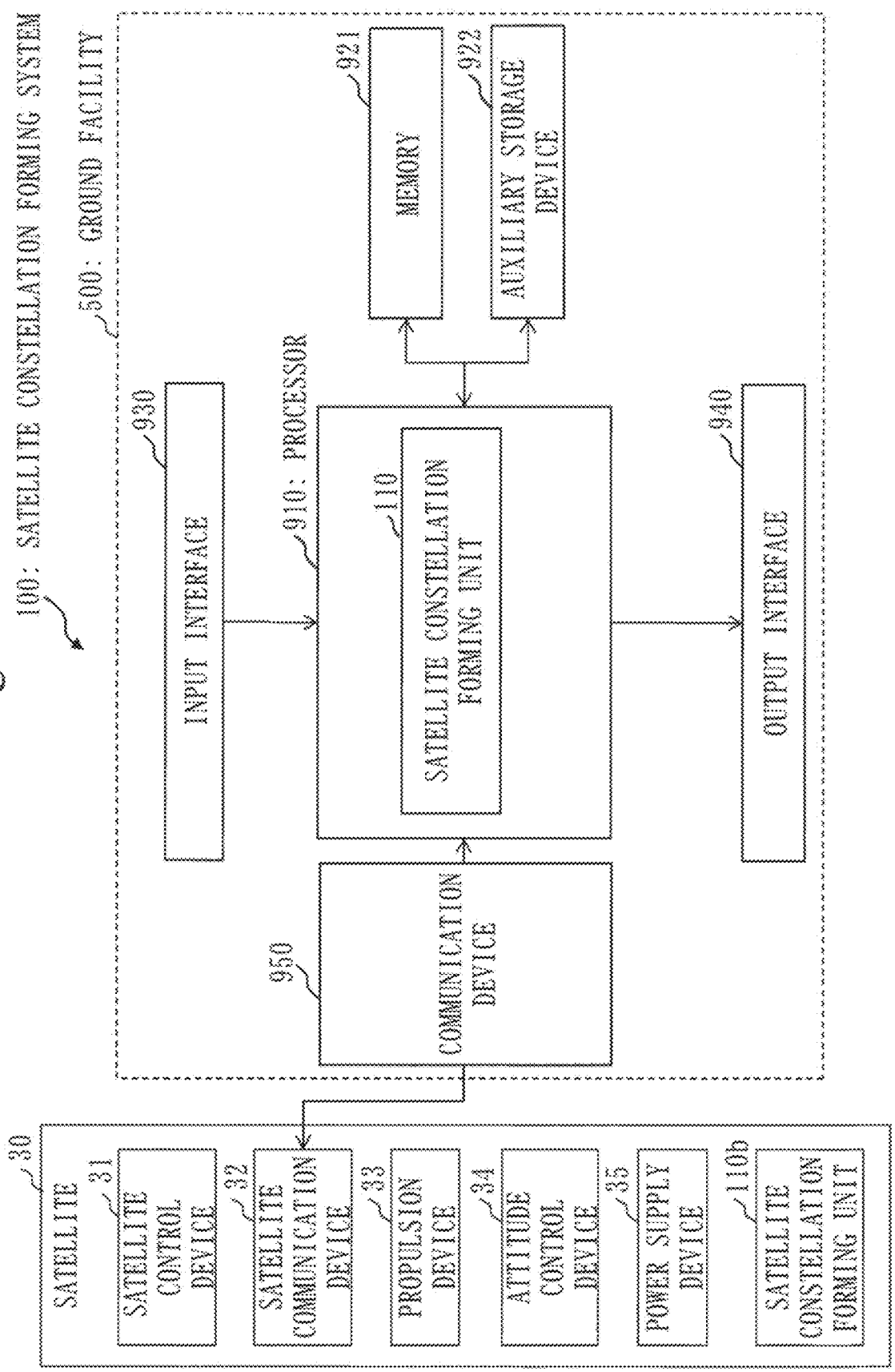
FIG. 9 is an example of a functional configuration of the satellite constellation forming system according to Embodiment 1.

FIG. 9 is a diagram illustrating an example of a functional configuration of the satellite constellation forming system 100 according to this embodiment.

The satellite 30 further includes a satellite constellation forming unit 110b to form a satellite constellation 20. The satellite constellation forming unit 110b included in each satellite 30 of a plurality of satellites and the satellite constellation forming unit 110 included in each ground facility 500 cooperatively realize the functions of the satellite constellation forming system 100 according to this embodiment. The satellite constellation forming unit 110b of the satellite 30 may be provided in the satellite control device 31.

\*\*\*Description of Satellite Constellation 20 According to this Embodiment\*\*\*

Figure 10:
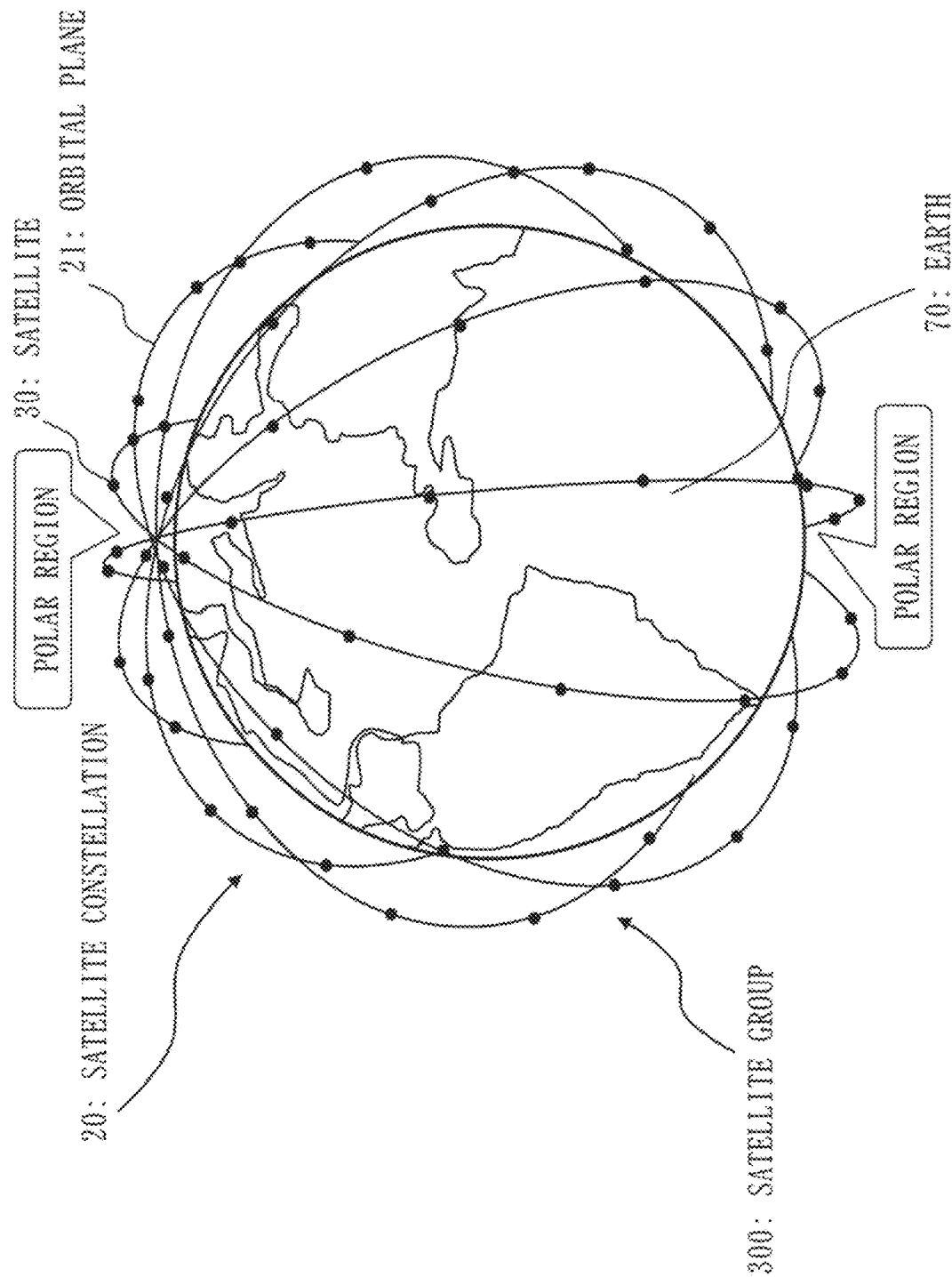
FIG. 10 is an example of a satellite constellation formed by the satellite constellation forming system according to Embodiment 1.
Figure 11:
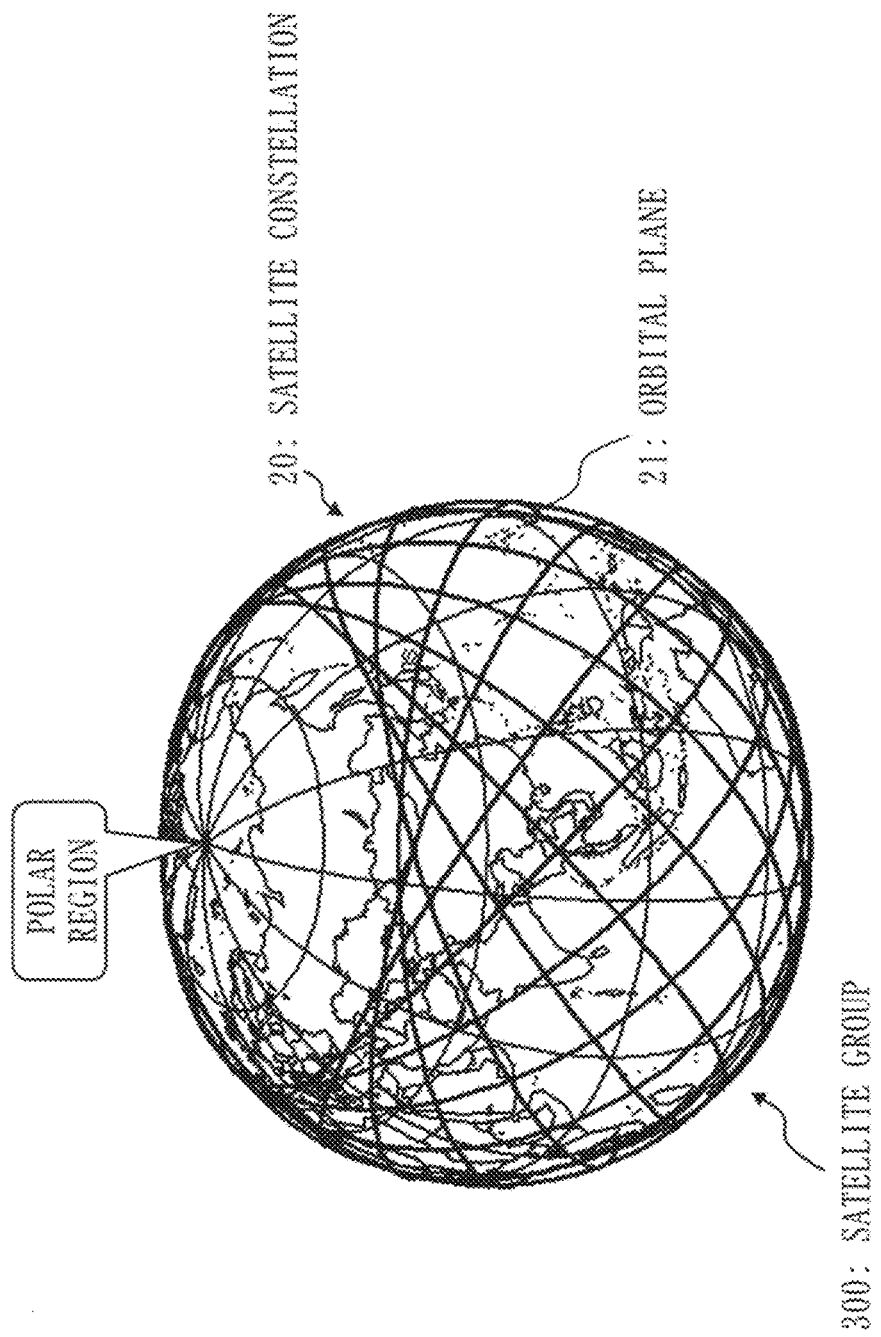
FIG. 11 is an example of a satellite constellation formed by the satellite constellation forming system according to Embodiment 1.

FIG. 10 is a diagram illustrating an example of the satellite constellation 20 formed by the satellite constellation forming system 100 according to this embodiment. FIG. 11 is a diagram illustrating an example of the satellite constellation 20 formed by the satellite constellation forming system 100 according to this embodiment.

In the satellite constellation 20 illustrated in FIG. 10, the orbital inclination of each of a plurality of orbital planes 21 is about 90 degrees, and the orbital planes 21 exist on mutually different planes.

In the satellite constellation 20 illustrated in FIG. 11, the orbital inclination of each of a plurality of orbital planes 21 is not about 90 degrees, and the orbital planes 21 exist on mutually different planes.

In the satellite constellation 20 according to this embodiment, the orbital altitudes of the orbital planes 21 are mutually different. Furthermore, in the satellite constellation 20 according to this embodiment, relative altitude differences between adjacent orbital planes in the plurality of orbital planes are sequentially arranged to be sinusoidal. In the satellite constellation 20, each of the orbital planes 21 has an orbital inclination such that the orbital periods of the orbital planes 21 are equal to each other.

In the satellite constellation 20 of FIG. 10, any given two orbital planes intersect at a point in the vicinity of the polar region. In the satellite constellation 20 of FIG. 11, any given two orbital planes intersect at a point not in the polar region. As illustrated in FIG. 11, the intersection points among the orbital planes each with an orbital inclination greater than 90 degrees move away from the polar region according to the orbital inclination. Depending on the combinations of orbital planes, orbital planes may intersect at various locations including the vicinity of the equator. For this reason, places where collisions may occur are diversified.

In this embodiment, the satellite constellation forming unit 110 forms a satellite constellation 20 in which relative altitude differences between adjacent orbital planes in a plurality of orbital planes are arranged to be sinusoidal.

Figure 12:
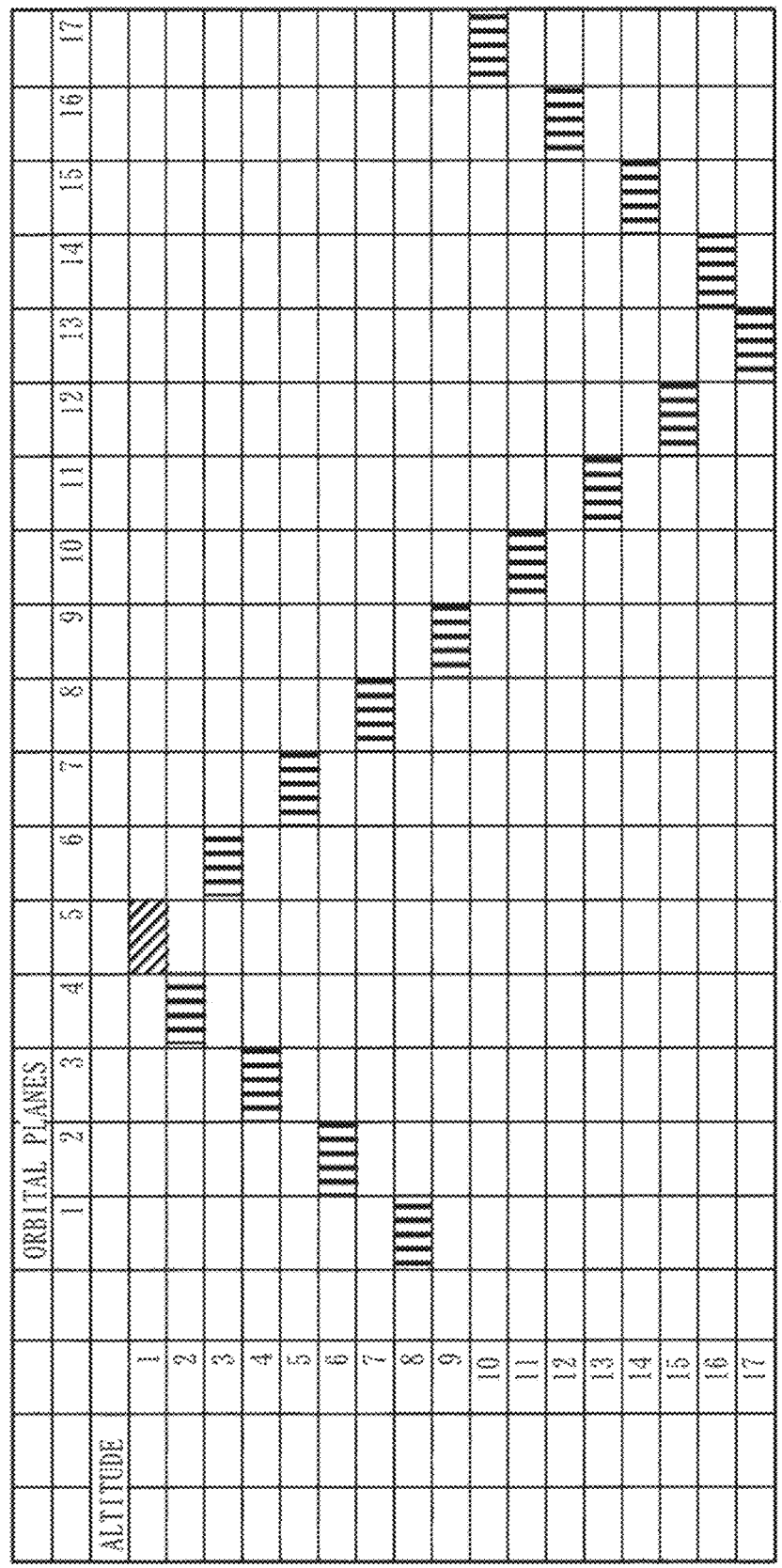
FIG. 12 is a diagram representing an example of relative altitude differences in a plurality of orbital planes according to Embodiment 1.

FIG. 12 is a diagram illustrating an example of relative altitude differences in a plurality of orbital planes according to this embodiment.

FIG. 12 illustrates relative altitude differences in orbital planes in a satellite constellation 20 having 17 orbital planes. The vertical axis indicates that the altitude of orbital plane 1 is highest, and the altitude becomes lower in descending order, and does not indicate the distance. FIG. 12 indicates that when orbital plane 1 is used as a reference plane and differences between adjacent planes are plotted, such as a difference in orbital altitude between orbital plane 1 and orbital plane 2 and a difference in orbital altitude between orbital plane 2 and orbital plane 3, this results in a sinusoidal arrangement.

If the altitudes of adjacent orbital planes are significantly different, the distance of handover by inter-satellite communication will be long and the drive angle range for mutually matching communication antennas will be wide, which are disadvantages. In contrast to this, in the satellite constellation 20 according to this embodiment, the altitude differences between adjacent orbits are constrained, so that the relative differences change gradually. Therefore, handover that contributes to mission cooperation with a nearby satellite is facilitated.

In an Earth observation satellite, the image quality of an optical sensor depends on the satellite altitude. Thus, by arranging the altitude difference between adjacent orbits to be small, there is an effect that high-quality images with no inconsistency between image scenes can be obtained.

With a satellite constellation equipped with optical sensors that capture images of the ground surface and are capable of imaging in an area wider than the distance between adjacent orbits above the equator, images of the entire globe can be captured exhaustively. Since the resolution and observation width of an optical sensor depend on the orbital altitude, in the case of a satellite constellation employing optical sensors of the same specifications, the resolution is highest and the observation width is smallest when images are captured under the lowest orbital altitude condition. Therefore, if the observation width of an optical sensor under the lowest orbital altitude condition is greater than the distance between adjacent orbits above the equator, images of the ground surface can be captured exhaustively, including above the equator.

If the altitudes of adjacent orbits are significantly different, discontinuities involving different resolutions are likely to appear at joints of images. However, in the satellite constellation forming system according to this embodiment, the altitude differences between adjacent orbits are constrained, so that there is an effect that image data of the entire globe with good image quality without noticeable joints of images can be obtained. Also note that the greater the difference in satellite altitude, the faster the relative movement speeds of the ground service ranges. Thus, in the satellite constellation forming system according to this embodiment, the relative movement amounts of adjacent service areas can be minimized, so that there is an effect that the transfer of data to a following satellite, called handover, in communication is facilitated and errors can be readily reduced.

Figure 13:
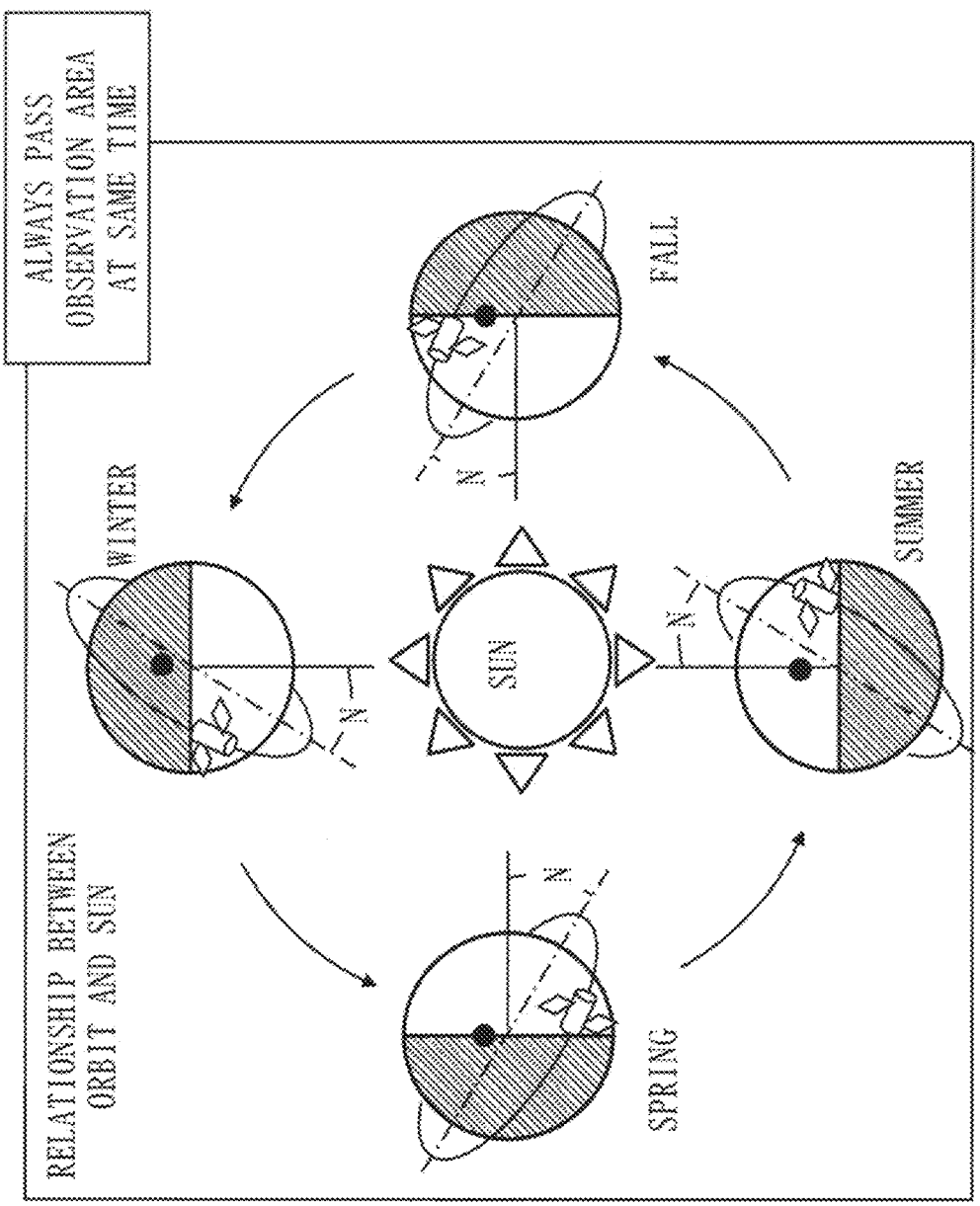
FIG. 13 is a diagram illustrating an orbital plane that satisfies conditions for a sun-synchronous orbit.

FIG. 13 is a diagram illustrating an orbital plane that satisfies conditions for a sun-synchronous orbit.

The satellite constellation forming unit 110 according to this embodiment forms a satellite constellation 20 in which the orbital altitudes of a plurality of orbital planes 21 are mutually different, and each of the orbital planes has an orbital inclination such that the orbital periods of the orbital planes 21 are equal to each other. Specifically, each of the orbital planes is a sun-synchronous orbit as illustrated in FIG. 13.

The satellite constellation forming system 100 sets parameters so that the orbital altitudes of the orbital planes 21 of the satellite constellation 20 are mutually different, and each orbital plane has an orbital inclination such that the orbital periods of the orbital planes 21 are equal to each other.

Then, using the parameters, the satellite constellation forming unit 110 forms the satellite constellation 20 in which the orbital altitudes of the orbital planes 21 are mutually different, and each orbital plane has an orbital inclination such that the orbital periods of the orbital planes 21 are equal to each other.

Figure 14:
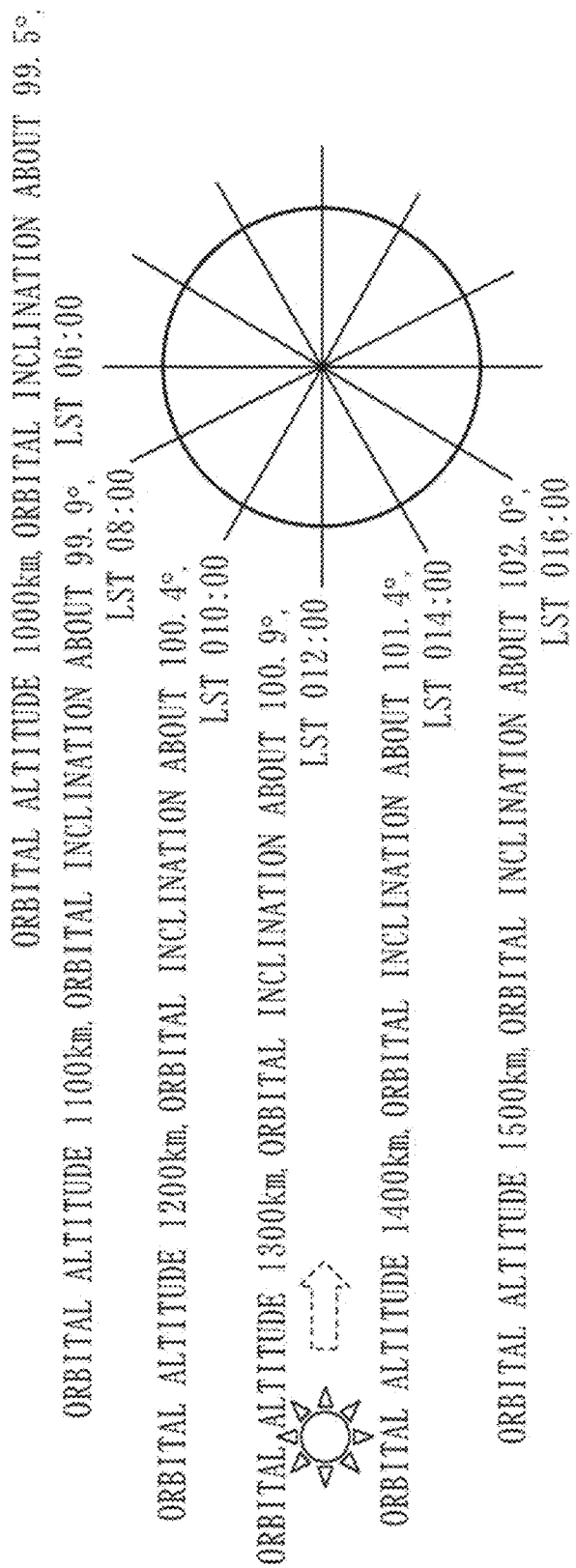
FIG. 14 is a schematic diagram illustrating a specific example of a satellite constellation according to Embodiment 1.

FIG. 14 is a schematic diagram illustrating a specific example of the satellite constellation 20 according to this embodiment.

Sun-synchronous orbital planes have equal orbital periods even when their orbital altitudes are different. An example of orbital planes that have different orbital altitudes and are sun-synchronous orbits is indicated below. The constraints for sun-synchronization are generally determined by the correlation between the orbital altitude and the orbital inclination, so that a sun-synchronous orbit can be formed by appropriately setting the orbital inclination depending on the orbital altitude.

Orbital altitude 1000 km: orbital inclination about 99.5°
Orbital altitude 1100 km: orbital inclination about 99.9°
Orbital altitude 1200 km: orbital inclination about 100.4°
Orbital altitude 1300 km: orbital inclination about 100.9°
Orbital altitude 1400 km: orbital inclination about 101.4°
Orbital altitude 1500 km: orbital inclination about 102.0°

For example, by setting orbital planes of the above six types of orbital altitudes with LSTs as indicated below, a group of orbital planes having angles mutually different by approximately 30 degrees each in the latitude direction is formed, and the relative angles between the orbital planes are always maintained. That is, six orbital planes whose orbital periods are equal are formed.

Sun-synchronous orbital plane at orbital altitude 1000 km: LST 06:00
Sun-synchronous orbital plane at orbital altitude 1100 km: LST 08:00
Sun-synchronous orbital plane at orbital altitude 1200 km: LST 10:00
Sun-synchronous orbital plane at orbital altitude 1300 km: LST 12:00
Sun-synchronous orbital plane at orbital altitude 1400 km: LST 14:00
Sun-synchronous orbital plane at orbital altitude 1500 km: LST 16:00

Sun-synchronous orbits are presented here as a typical example of achieving equal orbital periods. However, a plurality of orbital altitudes with equal orbital periods can also be similarly selected from orbits that are not sun-synchronous. That is, the satellite constellation forming unit 110 forms a satellite constellation 20 in which the orbital altitudes of a plurality of orbital planes 21 are mutually different, and each orbital plane has an orbital inclination such that the revolutions of the orbital planes 21 are in synchronization with each other.

In FIG. 14, for ease of description, an example in which the orbital altitudes are 1000 km, 1100 km, 1200 km, 1300 km, 1400 km, and 1500 km has been described. However, in this embodiment, it is assumed that in the satellite constellation 20 including the orbital planes having these orbital altitudes, relative altitude differences between adjacent orbital planes are sequentially arranged to be sinusoidal.

*Description of Operation*

Figure 15:
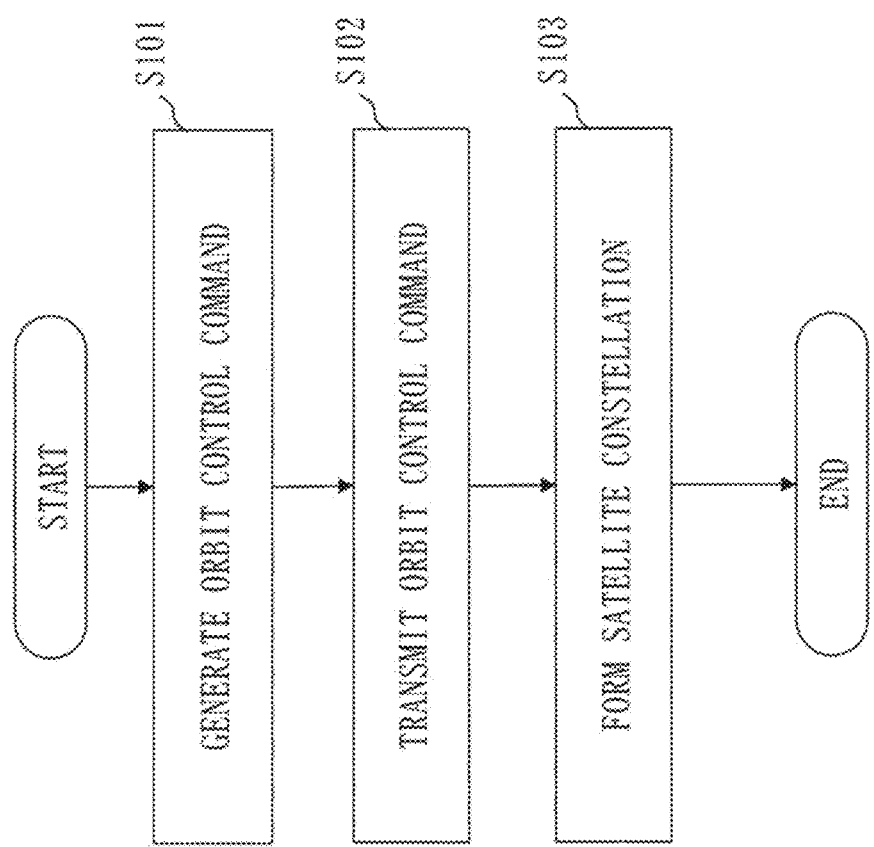
FIG. 15 is a flowchart illustrating operation of the satellite constellation forming system according to Embodiment 1.

Referring to FIG. 15, operation of the satellite constellation forming system 100 according to this embodiment will be described. A procedure for the operation of the satellite constellation forming system 100 is equivalent to a satellite constellation forming method. A program that realizes the operation of the satellite constellation forming system 100 is equivalent to a satellite constellation forming program.

In step S101, the satellite constellation forming unit 110 generates parameters for forming a satellite constellation 20. In the satellite constellation 20, the orbital altitudes of orbital planes 21 are mutually different, and relative altitude differences between adjacent orbital planes in a plurality of orbital planes are sequentially arranged to be sinusoidal. The satellite constellation forming unit 110 generates parameters for causing the orbital altitude of each orbital plane 21 of the plurality of orbital planes to be changed sequentially while maintaining a sinusoidal arrangement of the relative altitude differences between adjacent orbital planes in the plurality of orbital planes. Specifically, the satellite constellation forming unit 110 sets orbital altitudes, the number of which is larger by one than the number of orbital planes of the plurality of orbital planes. The satellite constellation forming unit 110 sequentially changes the orbital altitude of each of the orbital planes 21 by changing the orbital altitude of each of the orbital planes 21 so that an unoccupied orbital altitude, at which no satellite is flying, is filled sequentially.

More specifically, the orbit control command generation unit 510 of the ground facility 500 generates an orbit control command 51 to be transmitted to each satellite 30 in order to form the satellite constellation 20 described above. The orbit control command generation unit 510 generates the orbit control command 51 to set orbital altitudes, the number of which is a number larger by one than the number of orbital planes of the plurality of orbital planes, and to change the orbital altitude of each of the orbital planes 21 so that an unoccupied orbital altitude, at which no satellite is flying, is filled sequentially.

In step S102, the satellite constellation forming unit 110 delivers the parameters for forming the satellite constellation 20 to each satellite 30.

Specifically, the communication device 950 of the ground facility 500 transmits the orbit control command 51 generated in order to form the above-described satellite constellation 20 to each satellite 30.

In step S103, each satellite 30 controls the orbit and attitude in accordance with the parameters delivered from the satellite constellation forming unit 110. Specifically, the satellite communication device 32 of the satellite 30 receives the orbit control command 51 transmitted from the ground facility 500, and transmits it to the satellite control device 31. The satellite control device 31 of the satellite 30 controls the propulsion device 33 and the attitude control device 34 based on the orbit control command 51. Each satellites 30 controls the orbit in accordance with the orbit control command 51, thereby forming the satellite constellation 20.

By the above process, in the satellite constellation 20 according to this embodiment, each of the orbital planes 21 has an orbital inclination such that the orbital periods of the orbital planes 21 are equal to each other. That is, in the satellite constellation 20 according to this embodiment, the orbital inclination of each of the orbital planes 21 is maintained on average as a result so that the orbital periods of the orbital planes 21 are equal to each other.

FIGS. 16 to 19 are diagrams illustrating changing of orbital altitudes of the orbital planes 21 according to this embodiment.

Referring to FIGS. 16 to 19, a scheme will be described, by which an orbital altitude 23 of each orbital plane 21 is sequentially changed while maintaining a sinusoidal arrangement of relative altitude differences between adjacent orbital planes in a plurality of orbital planes.

In the satellite constellation forming system 100, N+1 different altitudes are pre-planned for the number of orbital planes, N, (N is a natural number), and the orbital altitude of each orbital plane 21 is changed so that an unoccupied altitude is filled sequentially. In this case, the altitude of only one orbital plane is passed. However, since a risk of a collision exists only at the intersection points of two orbital planes, it is easy to safely change the altitude by making sure that the timing is right.

FIGS. 16 to 19 are an example in which the number of orbital planes is N=16. Therefore, N+1 (=17) different orbital altitudes are set. Among the 17 altitudes, one altitude is an unoccupied slot. The altitudes are assigned sequentially to the orbital planes so that the altitude of the unoccupied slot and the other 16 altitudes are arranged to be sinusoidal. That is, in the satellite constellation 20, the relative altitude differences in the 17 altitudes are set to be sinusoidal.

Figure 16:
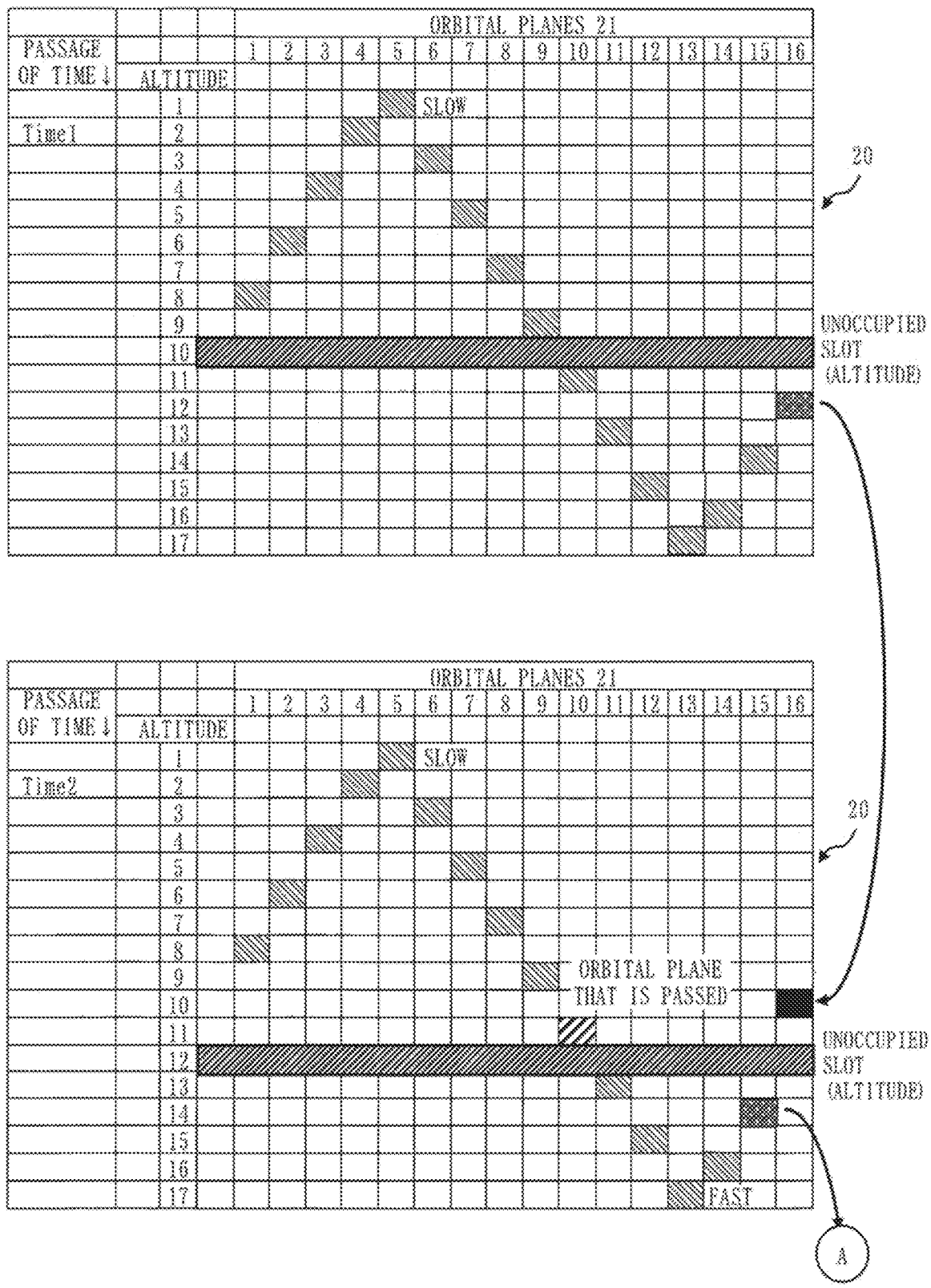
FIG. 16 is a diagram illustrating changing of orbital altitudes of orbital planes according to Embodiment 1.

In the upper table of FIG. 16, the unoccupied slot is altitude 10. The lower table of FIG. 16 indicates a state in which the satellites at altitude 12 have changed the satellite altitude to altitude 10, which has been the unoccupied slot. Then, altitude 12 becomes the unoccupied slot, and the satellites at altitude 14 will change the satellite altitude to altitude 12, which is the unoccupied slot.

Figure 17:
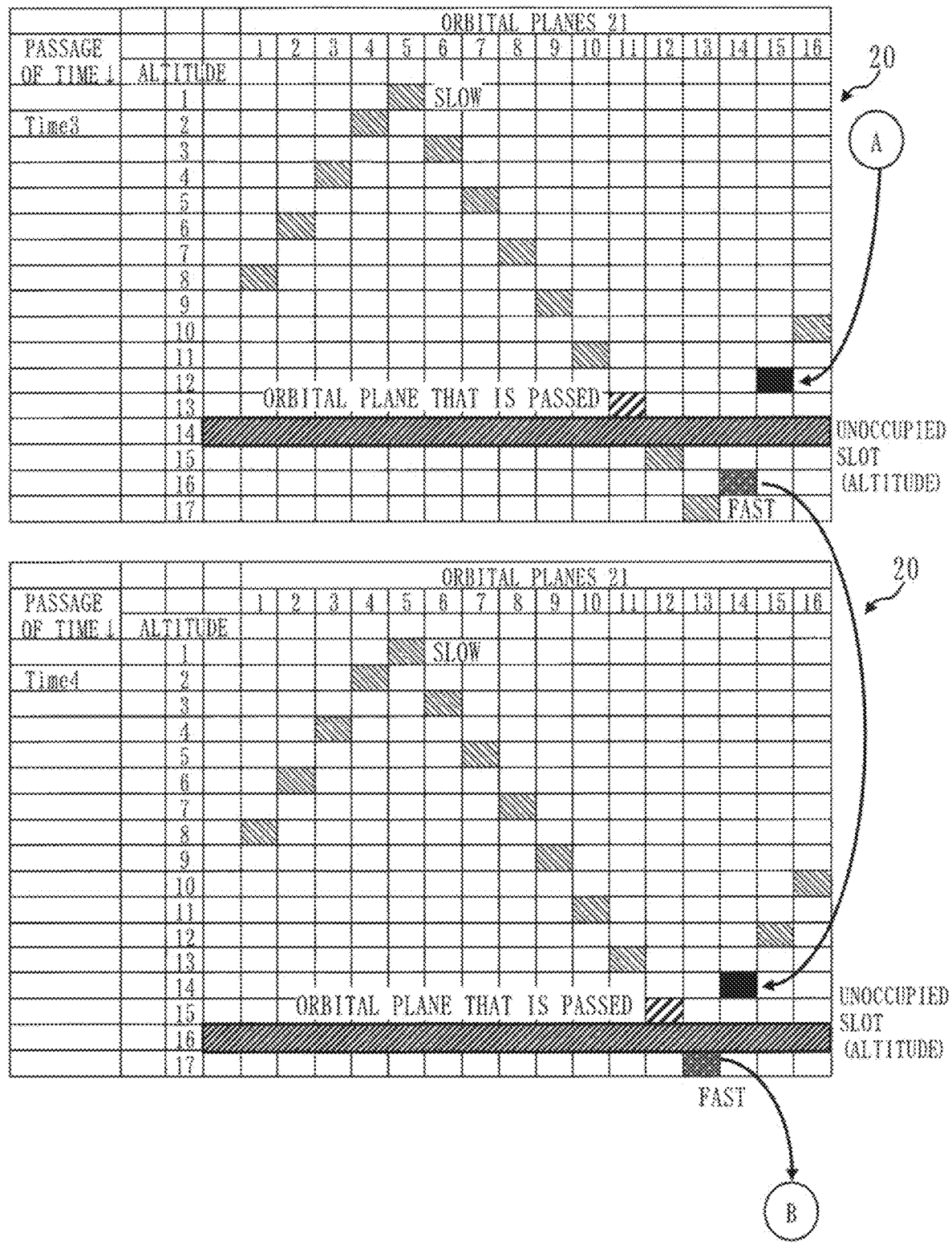
FIG. 17 is a diagram illustrating changing of orbital altitudes of orbital planes according to Embodiment 1.

In the upper table of FIG. 17, the unoccupied slot is altitude 14. The lower table of FIG. 17 indicates a state in which the satellites at altitude 16 have changed the satellite altitude to altitude 14, which has been the unoccupied slot. Then, altitude 16 becomes the unoccupied slot, and the satellites at altitude 17 will change the satellite altitude to altitude 16, which is the unoccupied slot. In this case, no orbital plane is passed.

Figure 18:
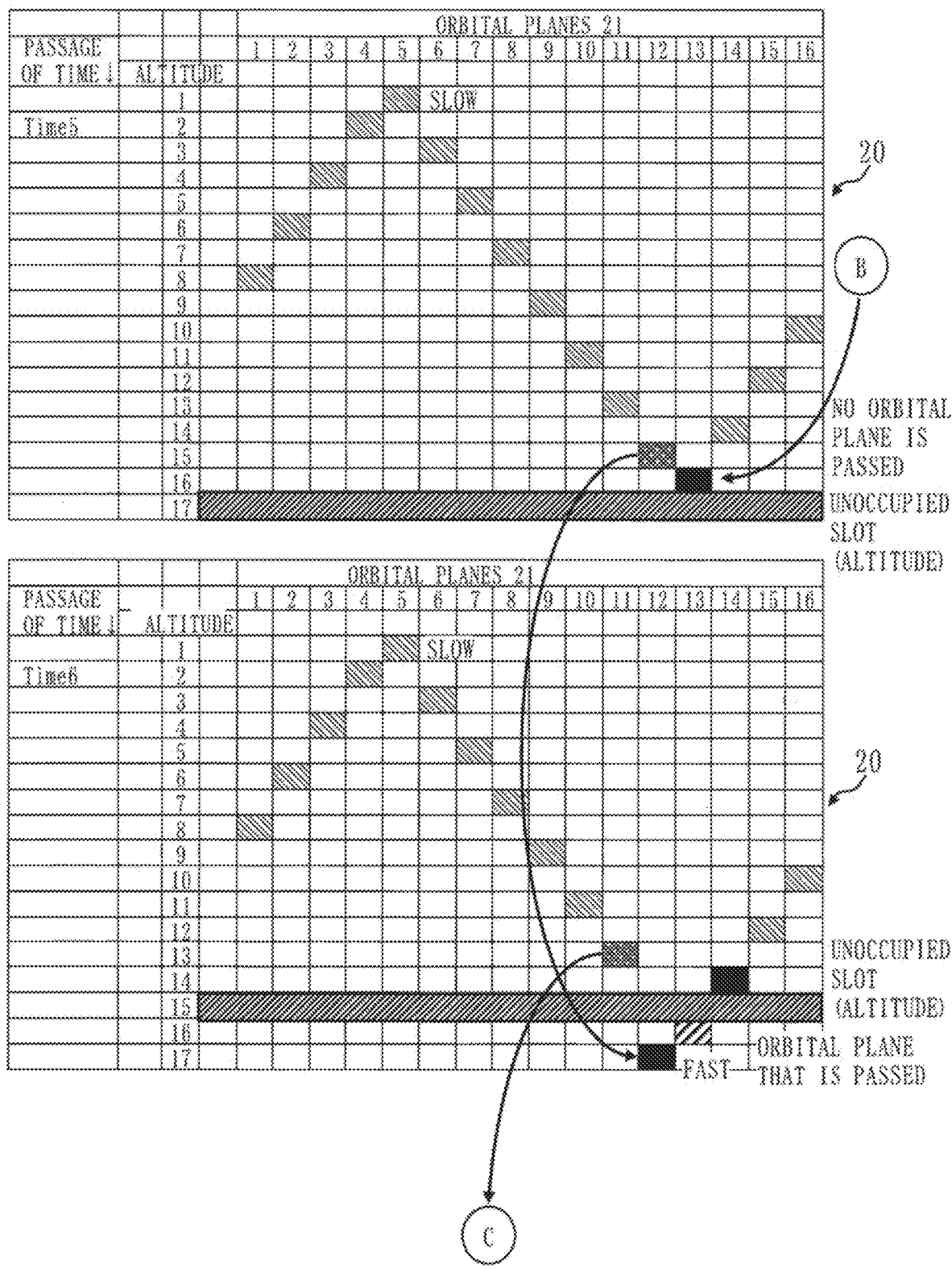
FIG. 18 is a diagram illustrating changing of orbital altitudes of orbital planes according to Embodiment 1.
Figure 19:
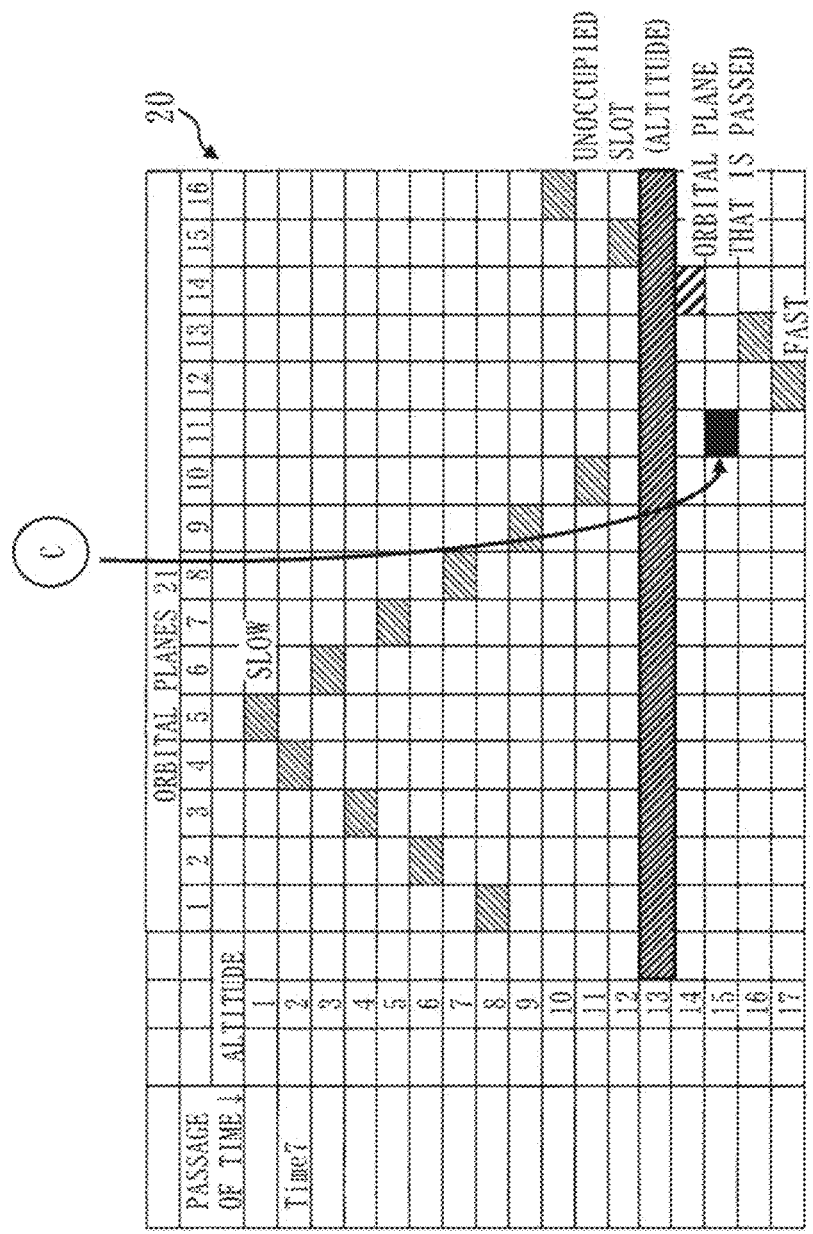
FIG. 19 is a diagram illustrating changing of orbital altitudes of orbital planes according to Embodiment 1.

In the upper table of FIG. 18, the unoccupied slot is altitude 17. The lower table of FIG. 18 indicates a state in which the satellites at altitude 15 have changed the satellite altitude to altitude 17, which has been the unoccupied slot. Then, altitude 15 becomes the unoccupied slot, and the satellites at altitude 13 will change the satellite altitude to altitude 15, which is the unoccupied slot.

In changing of altitudes, the satellites flying in an orbital plane at an altitude adjacent to the unoccupied slot move to the altitude of the unoccupied slot.

In this case, there is only one orbital plane whose orbital altitude is passed. However, the intersection points between two orbital planes are limited to two points, so that it is easy to achieve an altitude change by making sure that the passage timings of satellites are right to avoid an accidental collision at these two intersection points during the altitude change. The side that is going to change the orbital altitude performs a predictive analysis in advance so as to check that no collision will occur at the intersection points if the orbital altitude is changed by acceleration or deceleration, and then changes the orbit. If a risk of a collision is predicted as a result of the predictive analysis, it is possible to make sure that the passage timings of satellites are right by adjusting the spacing between adjacent satellites in advance. Specific details of timing adjustment will be described later in Embodiments 2 to 4.

In a mega-constellation in which a large number of satellites fly in each orbital plane, the satellites in each orbital plane fly at approximately equal intervals. Thus, even if the altitudes of the large number of satellites are changed simultaneously, it is easy for all the satellites to pass an orbital altitude while avoiding collisions. As a matter of course, the altitude of each satellite may be changed sequentially one by one, and after the change of the altitude is completed, a minor adjustment may be made to the relative intervals among the satellites in the same orbital plane.

It is easy to continue exchanging of information between satellites while the altitude is being changed. Specifically, in the case of a communication service, the altitude can be changed without interrupting a communication mission.

A specific example of changing of altitudes sinusoidally in the satellite constellation forming system 100 according to this embodiment will now be described.

Since the satellite ground speed is faster as the orbital altitude is lower, the time until the satellites in the same orbital plane are shifted by one satellite is shorter as the orbital altitude is lower. Specifically, a satellite at an altitude of 550 km completes 15 orbits per day, and a satellite at an altitude of 880 km completes 14 orbits per day. At a rough estimate, a difference of 0.003 orbits per altitude difference of 1 km occurs per day. That is, 0.003 orbits=1 orbit/(880−550) km. This is converted into an angle as follows: 0.003× 360=1.1 degrees/km.

When 50 satellites are operated in one orbital plane, the angle formed by two consecutive satellites is 360/50=7.2 degrees, and a positional shift of one satellite occurs in about 6.6 (=7.2/1.1) days. For example, if the satellites can be operated with an altitude difference of 100 m between adjacent altitudes, a positional shift of one satellite occurs in about 66 days. Therefore, if the altitudes are changed sinusoidally over a period of about 4 mouths, a positional shift between adjacent orbits due to a difference in satellite ground speed will cancel out, and the satellites can be operated permanently.

If it is decided to change the altitudes sinusoidally over a period of about 2 months, taking into consideration also other factors such as a time lag, it is sufficient that the orbital altitudes are changed once every two days in the satellite constellation forming system 100 involving about 30 orbital planes. If the altitude of one plane is to be changed at a time, the altitudes may be changed one by one every 1.5 hours on average.

The altitude of the satellite 30 is changed such that operating the propulsion device 33 for acceleration raises the altitude and operating it for deceleration lowers the altitude. However, in reality, it is difficult to realize an altitude change of 100 m in 1.5 hours. Therefore, the timing to start an altitude change arrives every 1.5 hours, and the change to a predetermined orbit will be completed with a delay. However, the ground speeds of satellites flying in altitudes that are close to each another are almost the same, so that satellites flying out of phase in two orbital planes so as to avoid a collision at the intersection points will not collide.

Description of Effects of this Embodiment

There may be a case in which for the purpose of providing a service by a plurality of satellites in cooperation, each satellite exchanges information with a satellite in an adjacent orbit. In orbital planes with mutually different orbital altitudes, satellites have different ground speeds, and the ground speed is faster as the orbital altitude is lower, making it difficult to exchange information between adjacent orbits with passage of time. Each satellite can be operated such that a partner for exchanging information is switched to a following satellite in the adjacent orbit. However, in order to avoid a loss of information during this switching, each satellite needs to stop exchanging information during the switching and resume exchanging information after the switching to the following satellite. Therefore, in a mega-constellation in which a large number of satellites require the switching, the suspension of a service has a great impact.

The switching also involves the trouble of establishing an information transmission environment for exchanging information with the following satellite. Specifically, in the case of inter-satellite optical communication, information cannot be transmitted until the directivity directions of transmission devices installed in both satellites are matched with extremely high directivity accuracy.

In a satellite constellation according to this embodiment, relative altitude differences between adjacent orbital planes in a plurality of orbital planes are sequentially arranged to be sinusoidal, and the satellite altitude of each orbital plane is sequentially changed sinusoidally with passage of time. Therefore, with the satellite constellation according to this embodiment, a service can be continued while avoiding a collision, without interrupting exchanging of information between orbits at different altitudes.

In the satellite constellation forming system according to this embodiment, different orbital planes have different orbital altitudes, so that there is no risk of a collision in a regular operation state. The altitudes are changed while maintaining a sinusoidal arrangement by making a minor adjustment to the orbital inclinations, so that there is no risk of occurrence of a shift in relative angles between orbital planes due to a difference in altitude. Even if an error occurs in a transient state, a minor adjustment can be easily made.

When information is exchanged between satellites in adjacent orbits, the positions relative to each other move due to a difference in satellite ground speed caused by a difference in orbital altitude. However, in the satellite constellation forming system according to this embodiment, by setting the orbital altitudes sinusoidally to minimize a difference between adjacent orbits, the amount of a shift is small and the time until a shift occurs is sufficiently long.

Since the relative orbital altitudes are changed sinusoidally, even if a shift widens at one time, the relative relationship will eventually change to reduce the shift, so that the shift will cancel out in the long term. Therefore, with the satellite constellation forming system according to this embodiment, it is not necessary to switch the satellites between which information is to be exchanged, so that a service can be continued permanently.

A shift occurs at a slower pace as a difference in satellite altitude is smaller. Thus, in the satellite constellation according to this embodiment, by setting the relative altitude differences to be small, the frequency of changing the altitudes can be reduced.

In the satellite constellation forming system according to this embodiment, the altitude of one orbital plane at most may be passed in changing of altitudes. However, the intersections points between two orbital planes are limited to two points, so that it is easy to make sure that the altitude is changed at the right timing so that no collision will accidentally occur at these two points. Thus, there is an effect that the altitudes can be changed safely while avoiding a collision.

\*\*\*Other Configurations\*\*\*

In this embodiment, the functions of the satellite constellation forming unit 110 are realized by software. As a variation, the functions of the satellite constellation forming unit 110 may be realized by hardware.

The satellite constellation forming system 100 includes an electronic circuit in place of the processor 910.

The electronic circuit is a dedicated electronic circuit that realizes the functions of the satellite constellation forming unit 110.

Specifically, the electronic circuit is a single circuit, a composite circuit, a programmed processor, a parallel-programmed processor, a logic IC, a GA, an ASIC, or an FPGA. GA is an abbreviation for Gate Array.

The functions of the satellite constellation forming unit 110 may be realized by one electronic circuit, or may be distributed among and realized by a plurality of electronic circuits.

As another variation, some of the functions of the satellite constellation forming unit 110 may be realized by the electronic circuit, and the rest of the functions may be realized by software.

Each of the processor and the electronic circuit is referred to also as processing circuitry. That is, in the satellite constellation forming system 100, the functions of the satellite constellation forming unit 110 are realized by the processing circuitry.

Embodiment 2

In this embodiment, additions to Embodiment 1 will be mainly described. Components that are substantially the same as those in Embodiment 1 are denoted by the same reference signs, and description thereof may be omitted.

\*\*\*Description of Configurations\*\*\*

In this embodiment, a scheme by which the satellite constellation forming system 100 changes the orbital altitudes of orbital planes 21 while avoiding a collision will be described.

The configurations of the satellite constellation forming system 100, the satellite constellation 20, the ground facility 500, and the satellite 30 are substantially the same as those in Embodiment 1.

\*\*\*Description of Operation\*\*\*

A procedure for operation of the satellite constellation forming system 100 is equivalent to a satellite constellation forming method. A program that realizes the operation of the satellite constellation forming system 100 is equivalent to a satellite constellation forming program.

The satellite constellation 20 according to this embodiment includes two orbital planes 21 each having a different normal direction and in each of which the same number of satellites are flying. A point in the neighborhood of the intersection point between the two orbital planes in each of the two orbital planes 21 will be referred to as an intersection neighborhood point Pc. The intersection neighborhood point Pc between the two orbital planes is a point in the neighborhood of a point at which the two orbital planes intersect with each other.

The satellite constellation forming unit 110 forms the satellite constellation 20 in which satellite passage timings of satellites 30 flying in the two orbital planes 21 do not coincide with each other at the intersection neighborhood point Pc in each of the two orbital planes 21. From this state in which the satellite passage timings do not coincide with each other, the satellite constellation forming unit 110 gradually changes the orbital altitude of at least one of the two orbital planes 21 while maintaining the state in which the satellite passage timings do not coincide with each other.

Specifically, the orbit control command generation unit 510 of the ground facility 500 generates an orbit control command 51 to form the satellite constellation 20 in which the satellite passage timings of the satellites 30 flying in the two orbital planes 21 do not coincide with each other at the intersection neighborhood point Pc of each of the two orbital planes 21. The orbit control command generation unit 510 generates the orbit control command 51 to gradually change the orbital altitude of at least one of the two orbital planes 21 from the state in which the satellite passage timings do not coincide with each other, while maintaining the state in which the satellite passage timings do not coincide with each other. The communication device 950 of the ground facility 500 transmits the orbit control command 51 to each satellite 30.

Figure 20:
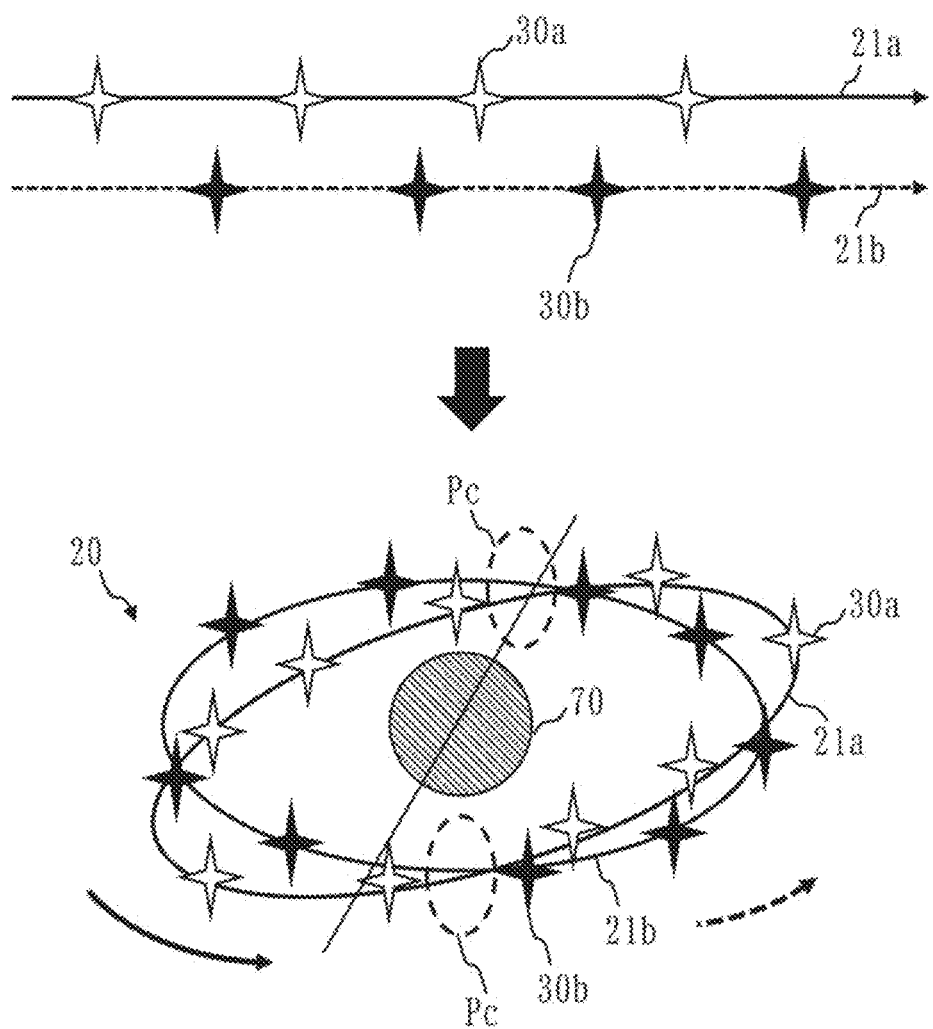
FIG. 20 is a diagram illustrating an example of a satellite constellation forming scheme according to Embodiment 2.

FIG. 20 is a diagram illustrating an example of the satellite constellation forming scheme according to this embodiment.

FIG. 20 indicates a state in which the orbital altitudes of two orbital planes 21a and 21b are mutually different and the satellite passage timings of satellites 30a and 30b do not coincide with each other at the intersection neighborhood point Pc in each of the orbital planes 21a and 21b. The satellite constellation forming unit 110 gradually matches the orbital altitudes of the two orbital planes 21a and 21b while maintaining the state in which the satellite passage timings do not coincide with each other.

If satellites are made to fly at the same altitude in orbital planes with different normal angles, there is a risk of a collision at an intersection point. If an additional satellite is to be launched into orbit after a large number of satellites are placed in their respective orbital planes, the risk of a collision is high.

Therefore, in this embodiment, the same number of satellites are first made to fly in formation at approximately equal intervals in each group, and then the orbital altitudes are gradually brought closer to each other. By gradually bringing the orbital altitudes closer to each other, the satellite groups at altitudes close to each other have approximately equal ground speeds. Therefore, the satellite groups that are already flying in formation out of phase with each other can change the orbital altitudes without a collision.

The satellite constellation forming unit 110 causes the orbital altitude of one orbital plane of the two orbital planes to pass the orbital altitude of the other orbital plane from a state in which satellite passage timings do not coincide with each other at the intersection neighborhood point Pc in each of the orbital planes, while maintaining the state in which the satellite passage timings do not coincide with each other. The satellite constellation forming unit 110 causes the satellites in one of the orbital planes to pass the orbital altitude of the other one of the orbital planes in a space between the intersection neighborhood point Pc and the next intersection neighborhood point Pc in each of the orbital planes 21.

Figure 21:
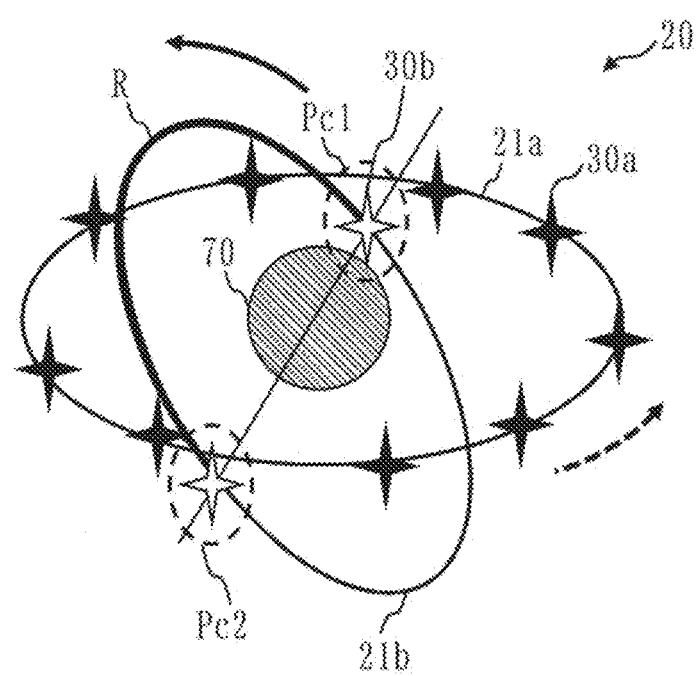
FIG. 21 is a diagram illustrating passing of an adjacent orbital plane by a satellite according to Embodiment 2.

FIG. 21 is a diagram illustrating passing of an adjacent orbital plane by the satellite 30b according to this embodiment.

FIG. 21 illustrates a state in which the satellite 30b in the orbital plane 21b passes the orbital plane 21a. The satellite 30b in the orbital plane 21b passes the orbital plane 21a in a space R between an intersection neighborhood point Pc1 and a next intersection neighborhood point Pc2.

When a satellite altitude is passed in a plurality of orbital planes with different normal angles, there is a risk of a collision at two intersection neighborhood points in each of two orbital planes. Since there is no risk of a collision except at these two points, if the orbital altitude is passed after passage of one intersection neighborhood point and before the next intersection neighborhood point, the orbital altitude can be changed without a collision.

Description of Effects of this Embodiment

The satellite constellation forming method of the satellite constellation forming system according to this embodiment forms a satellite constellation which has a plurality of orbital planes in which a satellite group of a large number of satellites is flying, and in which the same number of satellites are placed in each of the orbital planes with mutually different normal angles and the same altitude. In the satellite constellation forming method, the satellite groups in the orbital planes having a relative angle with respect to each other are first formed with different orbital altitudes, and then the satellite altitudes are gradually matched while maintaining a state in which satellite passage timings do not coincide with each other at two intersection neighborhood points in each of the two orbital planes. Therefore, with the satellite constellation forming method according to this embodiment, there is an effect that satellite groups flying at the same orbital altitude in a plurality of orbital planes can be formed without a risk of a collision.

The satellite constellation forming method of the satellite constellation forming system according to this embodiment forms a satellite constellation having a plurality of orbital planes in which a group of a large number of satellites is flying, and the same number of satellites are placed in each of the orbital planes with mutually different normal angles and different altitudes. In the satellite constellation forming method, satellite groups in the orbital planes having a relative angle with respect to each other are first formed with different orbital altitudes, and then while maintaining a state in which satellite passage timings do not coincide with each other at two intersection points between two orbital planes, the satellite altitude of one orbital plane is gradually passed by the satellites in the other orbital plane. Therefore, with the satellite constellation forming method according to this embodiment, there is an effect that a risk of a collision can be avoided in an intermediate stage of forming a satellite constellation with different orbital altitudes. With the satellite constellation forming method according to this embodiment, there is also an effect that orbital altitudes can be changed while continuing a service provided by a plurality of satellites in cooperation.

*Other Configurations*

<Deorbit Method>

A deorbit method in which one satellite deorbits in a satellite constellation according this embodiment will be described. The satellite constellation forming system 100 according to this embodiment uses the satellite constellation forming method according to this embodiment so as to control a deorbiting satellite so that the deorbiting satellite falls to the ground by passing a satellite flying at the orbital altitude of an adjacent orbital plane. Therefore, with the deorbit method by the satellite constellation forming system according to this embodiment, there is an effect that a satellite can be deorbited without fail while avoiding a collision.

<Debris Collection Method>

A debris collection method will be described, by which in a satellite constellation according to this embodiment, a debris collection satellite captures a satellite that cannot deorbit independently with external capture means, and then falls to the ground by passing a satellite flying at the orbital altitude of an adjacent orbital plane. The satellite constellation forming system 100 according to this embodiment uses the satellite constellation forming method according to this embodiment so as to control a debris collection satellite that has captured a satellite that cannot deorbit independently with external capture means, so that the debris collection satellite falls to the ground by passing a satellite flying at the orbital altitude of an adjacent orbital plane. Therefore, with the debris collection method by the satellite constellation forming system according to this embodiment, there is an effect that a debris collection satellite can be made to collect and remove debris without fail while avoiding a collision.

Embodiment 3

In this embodiment, additions to Embodiments 1 and 2 will be mainly described. Components that are substantially the same as those in Embodiments 1 and 2 are denoted by the same reference signs, and description thereof may be omitted.

*Description of Configurations*

In this embodiment, a specific scheme by which the satellite constellation forming system 100 changes the orbital altitudes of orbital planes 21 while avoiding a collision will be described.

The configurations of the satellite constellation forming system 100, the satellite constellation 20, the ground facility 500, and the satellite 30 are substantially the same as those in Embodiment 1.

Figure 22:
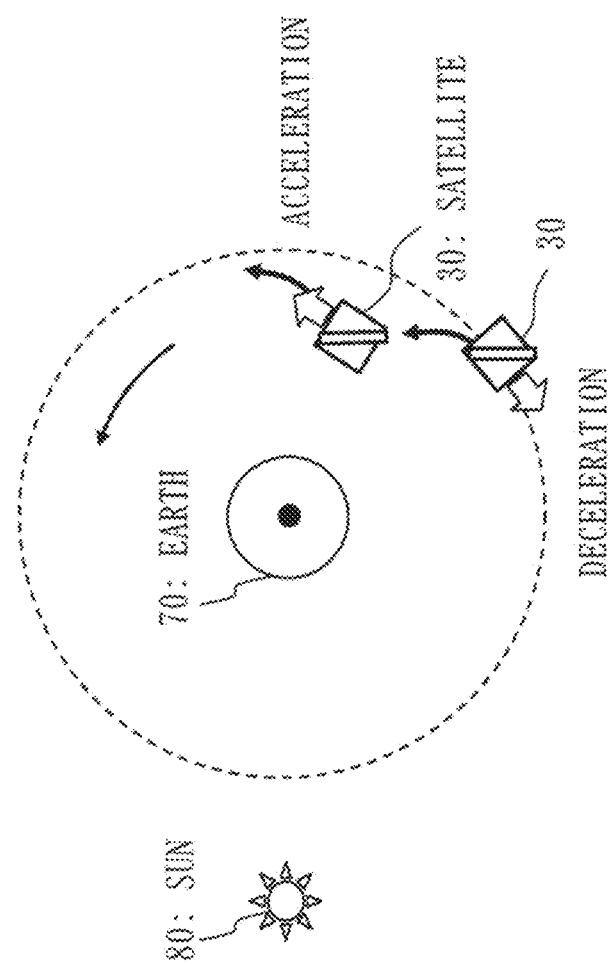
FIG. 22 is a diagram describing adjustment of satellite altitudes according to Embodiment 3.

FIG. 22 is a diagram describing adjustment of satellite altitudes.

Figure 23:
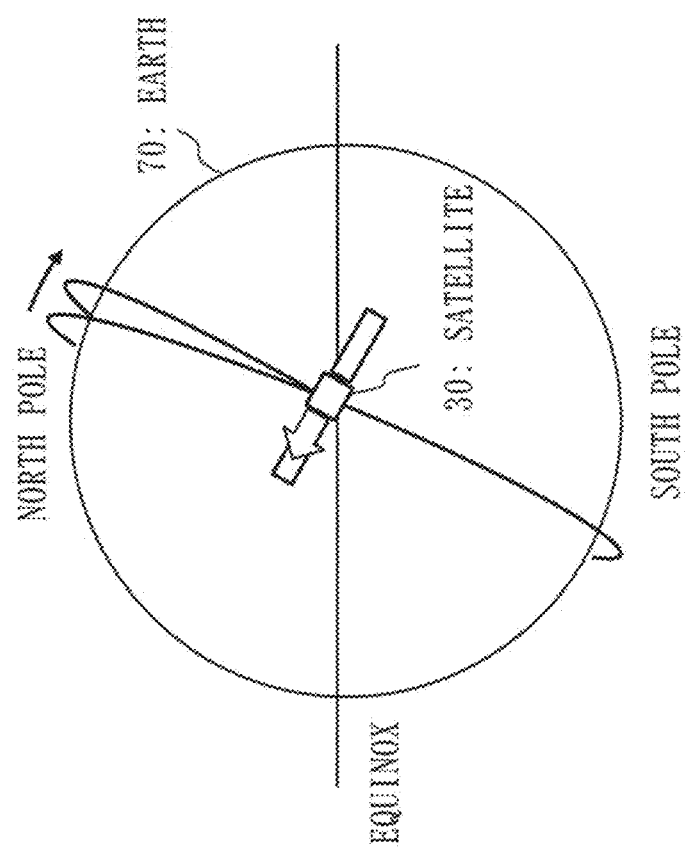
FIG. 23 is a diagram describing adjustment of orbital inclinations according to Embodiment 3.

FIG. 23 is a diagram describing adjustment of orbital inclinations.

The orbit control command generation unit 510 generates an orbit control command 51 for adjusting the altitude of each satellite 30. The orbit control command generation unit 510 generates the orbit control command 51 for adjusting the orbital inclination of each satellite 30. Then, the communication device 950 of the ground facility 500 transmits the orbit control command 51 to each satellite 30.

In each satellite 30, the satellite control device 31 receives the orbit control command 51 via the satellite communication device 32. The satellite control device 31 adjusts the satellite altitude and the orbital inclination in accordance with the orbit control command 51. Specifically, the satellite control device 31 controls the propulsion device 33 in accordance with the orbit control command 51. The satellite altitude and the orbital inclination can be adjusted by changing the satellite velocity by the propulsion device 33. As described above, the orbit control command generation unit 510 is an example of the satellite constellation forming unit 110. The orbit control command 51 is an example of parameters generated by the satellite constellation forming unit 110.

In FIG. 22, a filled circle inside the Earth 70 represents the north pole.

As the flying speed of the satellite 30 increases, the altitude of the satellite 30 increases. Then, as the altitude of the satellite 30 increases, the ground speed of the satellite 30 decreases.

As the flying speed of the satellite 30 decreases, the altitude of the satellite 30 decreases. Then, as the altitude of the satellite 30 decreases, the ground speed of the satellite 30 increases.

As indicated in FIG. 23, if the propulsion device 33 generates thrust in a direction orthogonal to the orbital plane at a point where the satellite 30 crosses the equator (dividing point), a minor adjustment can be effectively made to the orbital inclination.

\*\*\*Description of Functions\*\*\*

Figure 24:
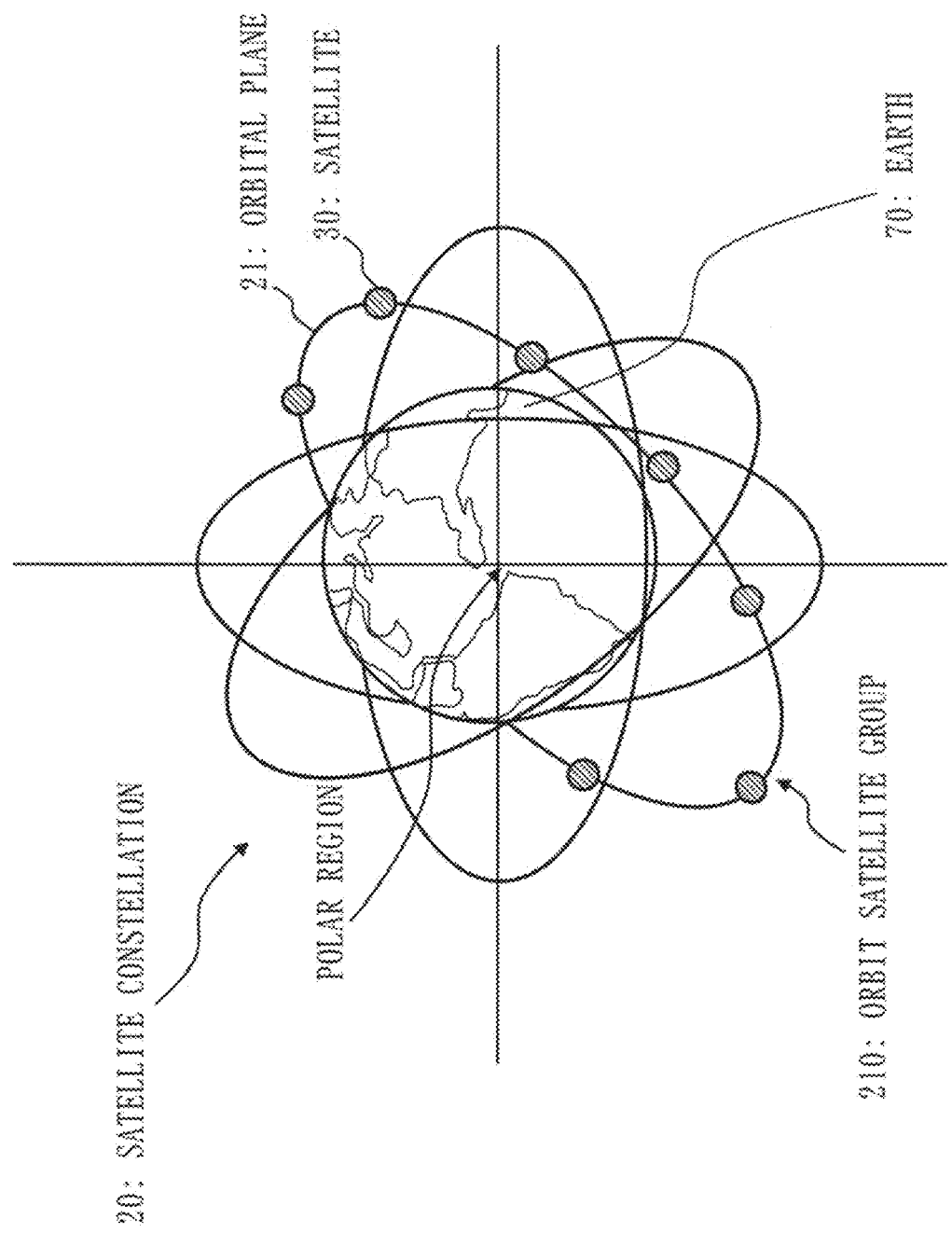
FIG. 24 is a diagram illustrating an example of a satellite constellation according to Embodiment 3.

FIG. 24 is a diagram illustrating an example of the satellite constellation 20 according to this embodiment.

The satellite constellation forming system 100 forms a satellite constellation 20 having a plurality of orbital planes 21 with mutually different normal directions. In each of the orbital planes 21, a plurality of satellites 30 fly as an orbit satellite group 210. Each satellite in the orbit satellite group 210 is equipped with the propulsion device 33 that changes the velocity of each satellite in the orbit satellite group 210. FIG. 24 illustrates a state in which a plurality of satellites 30 are flying as an orbit satellite group 210, using one orbital plane 21 as an example. In each of the orbital planes 21, an orbit satellite group 210 is flying similarly.

The configuration of each satellite 30 in the orbit satellite group 210 has been described in FIG. 7.

In this embodiment, the satellite constellation forming unit 110 causes the propulsion devices 33 of the satellites in the orbit satellite group 210 to operate in synchronization, for each orbital plane of the plurality of orbital planes.

The satellite constellation forming unit 110 causes each satellite in the orbit satellite group 210 in the first orbital plane 21 of the plurality of orbital planes to perform an acceleration and deceleration process of repeating operation of accelerating for a first time period T1 and then decelerating for the first time period T1. The satellite constellation forming unit 110 causes each satellite in the orbit satellite group 210 in the first orbital plane 21 to perform the acceleration and deceleration process, and also causes each satellite in the orbit satellite group 210 in an orbital plane adjacent to the first orbital plane to start the acceleration and deceleration process after a delay of a second time period T2 from the time point when the acceleration and deceleration process is started in the first orbital plane, and this is repeated for each satellite in the plurality of orbital planes.

The satellite constellation forming unit 110 sets the first time period T1 and the second time period T2 so that an altitude profile of orbital altitudes, in which relative altitude differences between adjacent orbital planes in the plurality of orbital planes are arranged sequentially, is sinusoidal.

The satellite constellation forming unit 110 calculates a value resulting from dividing the doubled first time period T1 by the number of orbital planes, N, of the plurality of orbital planes, as the second time period T2.

\*\*\*Description of Operation\*\*\*

Operation of the satellite constellation forming system 100 according to this embodiment will be described.

The satellite constellation forming system 100 according to this embodiment forms a satellite constellation 20 having N orbital planes 21 with mutually different normal directions. A plurality of satellites 30 flying in the same orbital plane are an orbit satellite group 210.

The satellite constellation forming unit 110 causes the satellites 30 in the same orbital plane to operate the respective propulsion devices 33 in synchronization.

It is assumed that the satellite constellation 20 according to this embodiment is composed of N orbital planes: the first orbital plane, the second orbital plane, the third orbital plane, . . . , the Nth orbital plane.

The satellite constellation forming unit 110 causes the satellites 30 in the first orbital plane to repeat operation of accelerating for the first time period T1 and then decelerating for the first time period T1. After a delay of a second time period with respect to the first orbital plane, the satellite constellation forming unit 110 causes the satellites in the second orbital plane, which is adjacent to the first orbital plane, to repeat operation of accelerating and decelerating similarly to the operation of the first orbital plane. The satellite constellation forming unit 110 sets the first time period T1 and the second time period T2 so that the altitude profile of orbital altitudes, in which relative altitude differences between adjacent orbital planes in the N orbital planes 21 are arranged sequentially, is approximately sinusoidal. Specifically, the altitude profile is those illustrated in FIG. 12 and FIGS. 16 to 19.

The propulsion device 33 of each satellite 30 in the first orbital plane repeats the acceleration and deceleration process of operating toward acceleration for about the first time period T1 and then operating toward deceleration for the first time period T1. The propulsion device 33 of each satellite 30 in the second orbital plane adjacent to the first orbital plane repeats the acceleration and deceleration process of operating toward acceleration for about the first time period T1 and then operating toward deceleration for the first time period T1, after a delay of a time period T1×2/N with respect to the adjacent first orbital plane. Similarly, the propulsion device 33 of each satellite 30 in the third orbital plane adjacent to the second orbital plane repeats the acceleration and deceleration process of operating toward acceleration for about the first time period T1 and then operating toward deceleration for the first time period T1, after a delay of the time period T1×2/N with respect to the second orbital plane 21. In this way, the same operation is repeated until the Nth orbital plane.

In the satellite constellation forming system 100 according to this embodiment, the first time period T1 and the second time period T2 are set so that the altitude profile of the first orbital plane to the Nth orbital plane is approximately sinusoidal. In the satellite constellation forming system 100 according to this embodiment, by setting T2 to roughly T1×2/N, the altitude profile of the N orbital planes becomes approximately sinusoidal.

Description of Effects of This Embodiment

In the satellite constellation forming system 100 according to this embodiment, the altitudes of the N orbital planes are varied. Since the orbital planes at different altitudes have no intersection points between them, there is no risk of a collision between satellites. Orbital planes with the matching altitudes have intersection points between them, but each orbital plane has only a maximum of one orbital plane with which a match in altitude may occur. Thus, it is easy to avoid a collision by arranging that satellite passage timings do not coincide with each other at the intersection points.

The rotation speeds of orbital planes with different orbital altitudes are different in an azimuth direction, so that the relative angles between the orbital planes gradually change. However, since the high and low relationship of the altitudes is switched sinusoidally, the average relative angle is maintained as a result. Therefore, in the satellite constellation forming system 100 according to this embodiment, it is not necessary to intentionally maintain the relative angles of the orbital planes by adjusting the optimum orbital inclination for each orbital altitude.

The satellite ground speeds are different in orbital planes at different orbital altitudes, so that the relative positional relationship between satellites flying in adjacent orbits gradually changes. However, in the satellite constellation forming system 100 according to this embodiment, the high and low relationship of the altitudes is switched sinusoidally, so that the average relative positional relationship is maintained as a result. Therefore, with the satellite constellation forming system 100 according to this embodiment, a service can be continued without switching communication partner satellites between adjacent orbits.

In the satellite constellation forming system 100 according to this embodiment, the relative positional relationship can be controlled without depending on orbital position accuracy and measurement accuracy of each satellite. Therefore, with the satellite constellation forming system 100 according to this embodiment, a collision can be avoided without separation by a large distance including an error component and a margin. Since the relative altitude differences may be small, there is an effect that propellant can be saved and the altitudes can be slowly changed. As a result, with the satellite constellation forming system 100 according to this embodiment, a large number of satellites in all orbital planes can be controlled by programs, allowing the system to be realized as an automated system.

Embodiment 4

In this embodiment, additions to Embodiment 3 will be mainly described. Components that are substantially the same as those in Embodiments 1 to 3 are denoted by the same reference signs, and description thereof may be omitted.

*Description of Configurations*

In this embodiment, the ground facility 500 for the satellite constellation forming system 100 for forming the satellite constellation 20 described in Embodiment 3 will be described.

The configurations of the satellite constellation forming system 100, the satellite constellation 20, the ground facility 500, and the satellite 30 are substantially the same as those in Embodiment 1.

*Description of Functions*

The communication device 950 of the ground facility 500 transmits and receives signals for tracking and controlling each satellite in the orbit satellite group 210 of each of the orbital planes 21 in the satellite constellation 20.

The orbit control command generation unit 510 of the ground facility 500 generates an orbit control command 51 to cause the propulsion devices of the satellites in the orbit satellite group 210 to operate in synchronization, for each orbital plane of the plurality of orbital planes. The orbit control command 51 causes each satellite in the orbit satellite group of the first orbital plane of the plurality of orbital planes to perform the acceleration and deceleration process of repeating operation of accelerating for the first time period T1 and then decelerating for the first time period T1. The orbit control command 51 causes each satellite in the orbit satellite group 210 in an orbital plane adjacent to the first orbital plane to start the acceleration and deceleration process after a delay of the second time period T2 from the time point when the acceleration and deceleration process is started in the first orbital plane. The orbit control command generation unit 510 generates the orbit control command 51 to cause each satellite in the plurality of orbital planes to repeat the above process.

The communication device 950 of the ground facility 500 transmits the orbit control command 51 to each satellite in the orbit satellite group 210 in each of the orbital planes.

*Description of Operation*

As described in Embodiment 1, the ground facility 500 controls a large number of satellites in all orbital planes by programs. Specifically, this is as described below.

The ground facility 500 measures time-dependent orbital positions of all the satellites 30. The time-dependent orbital positions may be measured using a positioning satellite signal receiving device mounted on each satellite 30 as measuring means. Specifically, a Global Positioning System (GPS) receiver is mounted on each satellite, and time and position information are transmitted to the ground as telemetry data. Monitoring the trend of this will result in measurement of time-dependent orbital positions.

Alternatively, ranging measurement from the ground may be used. Alternatively, the satellite orbital period may be measured to analyze and figure out the satellite ground speed or orbital altitude.

The ground facility 500 launches satellites into orbit so that the satellites in the same orbital planes are placed at approximately equal intervals, and then causes the satellites to fly at the same altitude and the same orbital inclination. As a result, the satellites in the same orbital plane fly in synchronization while maintaining the same phase angle.

The ground facility 500 transmits, to each satellite 30, an instruction to operate the propulsion device on condition that satellite passage timings do not coincide with each other at intersection points between two orbital planes when the altitudes of the orbital planes are switched. When the altitudes of different orbits are to be switched, if satellites are flying in the same orbital plane at equal intervals and the same number of satellites are flying at equal intervals in an adjacent orbital plane so that the positions of the satellites are not aligned with the positions of the satellite in the other orbital plane, and the phases are different, the altitudes of the satellites can be switched without colliding with each other.

Specifically, the orbit control command generation unit 510 of the ground facility 500 transmits, to each satellite 30, an orbit control command 51 to operate the propulsion device 33 on condition that satellite passage timings do not coincide with each other at intersection points between two orbital planes when the altitudes of the orbital planes are switched.

The ground facility 500 measures a relative angle in the azimuth direction, which depends on passage of time in the orbital planes. As measurement means, the flying positions in the orbital planes may be monitored according to passage of time.

The relative angle between the orbital planes changes in a time period of about T1, but it is possible to determine whether the angle between the orbital planes is uniform by comparing average values over a sufficiently long period of time. Therefore, if they are not uniform, instructions are given to the satellites in the orbital planes so as to adjust the thrust of the propulsion device 33 of each satellite 30 to make a minor adjustment to the orbital altitude so that the relative angle between the orbital planes becomes uniform.

Specifically, the orbit control command generation unit 510 of the ground facility 500 transmits, to each satellite 30, the orbit control command 51 to adjust the thrust of the propulsion device 33 of each satellite 30 so as to make a minor adjustment to the orbital altitude so that the relative angle between the orbital planes becomes uniform.

When out-of-synchronization behavior is detected among the satellites due to a cause such as a failure of an individual satellite, the ground facility issues an alarm and implements a human-induced measure only for the relevant satellite.

Description of Effects of This Embodiment

With the satellite constellation forming system 100 according to this embodiment, the ground facility 500 can be automated and labor can be saved. The ground facility 500 monitors transitions in the relative positional relationship of a group of satellites in the same orbital plane, the relative relationship between orbital planes, and the altitudes. The ground facility 500 gradually reduces the output of the propulsion device while maintaining the condition for avoiding a collision. As a result, the altitude difference between the highest altitude and the lowest altitude among different orbital planes is reduced, and changes in the relative angle between orbital planes and differences in the satellite ground speeds are also reduced. Therefore, the satellite constellation forming system 100 according to this embodiment allows for the altitudes to be slowly changed sinusoidally, so that the risk of a collision can be reduced and the amount of propellant consumed can also be reduced.

In Embodiments 1 to 4 above, each unit of the satellite constellation forming system has been described as an independent functional block. However, the configuration of the satellite constellation forming system may be different from the configurations in the embodiments described above. The functional blocks of the satellite constellation forming system may be arranged in any configuration, provided that the functions described in the above embodiments can be realized. The satellite constellation forming system may be one device or may be a system composed of a plurality of devices.

A plurality of portions of Embodiments 1 to 4 may be implemented in combination. Alternatively, one portion of these embodiments may be implemented.

These embodiments may be implemented as a whole or partially in any combination.

That is, in Embodiments 1 to 4, each of the embodiments may be freely combined, or any constituent element of each of the embodiments may be modified, or any constituent element may be omitted in each of the embodiments.

The above embodiments are essentially preferable examples, and are not intended to limit the scope of the present invention, the scope of applications of the present invention, and the scope of uses of the present invention. Various modifications can be made to the above embodiments as necessary.

REFERENCE SIGNS LIST

20: satellite constellation; 21, 21a, 21b: orbital plane; 30, 30a, 30b: satellite; 31: satellite control device; 32: satellite communication device; 33: propulsion device; 34: attitude control device; 35: power supply device; 51: orbit control command; 70: Earth; 100: satellite constellation forming system; 110: satellite constellation forming unit; 210: orbit satellite group; 300: satellite group; 500: ground facility; 510: orbit control command generation unit; 520: analytical prediction unit; 910: processor; 921: memory; 922: auxiliary storage device; 930: input interface; 940: output interface; 950: communication device.

The invention claimed is:

1. A satellite constellation forming system to form a satellite constellation having a plurality of orbital planes in each of which a plurality of satellites fly as an orbit satellite group, the plurality of orbital planes having mutually different normal directions, each of the plurality of satellites in the orbit satellite group including a propulsion device to change velocity of each of the plurality of satellites in the orbit satellite group, the satellite constellation forming system comprising processing circuitry to cause propulsion devices of the plurality of satellites in the orbit satellite group to operate in synchronization, for each orbital plane of the plurality of orbital planes, wherein the processing circuitry causes each satellite in an orbit satellite group in a first orbital plane of the plurality of orbital planes to perform an acceleration and deceleration process of repeating operation of accelerating for a first time period and then decelerating for the first time period, and causes each satellite in an orbit satellite group in an orbital plane adjacent to the first orbital plane to start the acceleration and deceleration process after a delay of a second time period from a time point when the acceleration and deceleration process is started in the first orbital plane, repeatedly for each of the plurality of orbital planes.

2. The satellite constellation forming system according to claim 1, wherein the processing circuitry sets the first time period and the second time period so that an altitude profile of orbital altitudes, in which relative altitude differences between adjacent orbital planes in the plurality of orbital planes are arranged sequentially, is sinusoidal.

3. The satellite constellation forming system according to claim 1, wherein the processing circuitry calculates, as the second time period, a value resulting from dividing the first time period that is doubled by the number of orbital planes of the plurality of orbital planes.

4. A satellite constellation forming method of a satellite constellation forming system to form a satellite constellation having a plurality of orbital planes in each of which a plurality of satellites fly as an orbit satellite group, the plurality of orbital planes having mutually different normal directions, each of the plurality of satellites in the orbit satellite group including a propulsion device to change velocity of each of the plurality of satellites in the orbit satellite group, the satellite constellation forming method comprising:

causing propulsion devices of the plurality of satellites in the orbit satellite group to operate in synchronization, for each orbital plane of the plurality of orbital planes; and causing each satellite in an orbit satellite group in a first orbital plane of the plurality of orbital planes to perform an acceleration and deceleration process of repeating operation of accelerating for a first time period and then decelerating for the first time period, and causing each satellite in an orbit satellite group in an orbital plane adjacent to the first orbital plane to start the acceleration and deceleration process after a delay of a second time period from a time point when the acceleration and deceleration process is started in the first orbital plane, repeatedly for each of the plurality of orbital planes.

5. A non-transitory computer readable medium storing a satellite constellation forming program for a satellite constellation forming system to form a satellite constellation having a plurality of orbital planes in each of which a plurality of satellites fly as an orbit satellite group, the plurality of orbital planes having mutually different normal directions, each of the plurality of satellites in the orbit satellite group including a propulsion device to change velocity of each of the plurality of satellites in the orbit satellite group, the satellite constellation forming program causing a computer to execute:
  a process of causing propulsion devices of the plurality of satellites in the orbit satellite group to operate in synchronization, for each orbital plane of the plurality of orbital planes; and
  a process of causing each satellite in an orbit satellite group in a first orbital plane of the plurality of orbital planes to perform an acceleration and deceleration process of repeating operation of accelerating for a first time period and then decelerating for the first time period, and causing each satellite in an orbit satellite group in an orbital plane adjacent to the first orbital plane to start the acceleration and deceleration process after a delay of a second time period from a time point when the acceleration and deceleration process is started in the first orbital plane, repeatedly for each of the plurality of orbital planes.

6. The non-transitory computer readable medium storing the satellite constellation forming program according to claim 5, further causing the computer to execute
  a process of setting the first time period and the second time period so that an altitude profile of orbital altitudes, in which relative altitude differences between adjacent orbital planes in the plurality of orbital planes are arranged sequentially, is sinusoidal.

7. The non-transitory computer readable medium storing the satellite constellation forming program according to claim 5, further causing the computer to execute
  a process of calculating, as the second time period, a value resulting from dividing the first time period that is doubled by the number of orbital planes of the plurality of orbital planes.

8. A ground device of a satellite constellation forming system to form a satellite constellation having a plurality of orbital planes in each of which a plurality of satellites fly as an orbit satellite group, the plurality of orbital planes having mutually different normal directions, each of the plurality of satellites in the orbit satellite group including a propulsion device to change velocity of each of the plurality of satellites in the orbit satellite group, the ground device comprising:
  a communication device to transmit and receive signals for tracking and controlling each satellite in the orbit satellite group in each orbital plane of the plurality of orbital planes of the satellite constellation; and
  processing circuitry to generate an orbit control command to cause propulsion devices of the plurality of satellites in the orbit satellite group to operate in synchronization, for each orbital plane of the plurality of orbital planes, and to cause each satellite in an orbit satellite group in a first orbital plane of the plurality of orbital planes to perform an acceleration and deceleration process of repeating operation of accelerating for a first time period and then decelerating for the first time period, and cause each satellite in an orbit satellite group in an orbital plane adjacent to the first orbital plane to start the acceleration and deceleration process after a delay of a second time period from a time point when the acceleration and deceleration process is started in the first orbital plane, repeatedly for each of the plurality of orbital planes,
  wherein the communication device transmits the orbit control command to each satellite in the orbit satellite group in each orbital plane of the plurality of orbital planes.

9. The ground device according to claim 8,
  wherein the processing circuitry sets the first time period and the second time period so that an altitude profile of orbital altitudes, in which relative altitude differences between adjacent orbital planes in the plurality of orbital planes are arranged sequentially, is sinusoidal.

10. The ground device according to claim 8,
  wherein the processing circuitry calculates, as the second time period, a value resulting from dividing the first time period that is doubled by the number of orbital planes of the plurality of orbital planes.

11. The satellite constellation forming system according to claim 2,
  wherein the processing circuitry calculates, as the second time period, a value resulting from dividing the first time period that is doubled by the number of orbital planes of the plurality of orbital planes.

12. The non-transitory computer readable medium storing the satellite constellation forming program according to claim 6, further causing the computer to execute
  a process of calculating, as the second time period, a value resulting from dividing the first time period that is doubled by the number of orbital planes of the plurality of orbital planes.

13. The ground device according to claim 9,
  wherein the processing circuitry calculates, as the second time period, a value resulting from dividing the first time period that is doubled by the number of orbital planes of the plurality of orbital planes.

* * * * *